(12) United States Patent
Weekes et al.

(10) Patent No.: US 11,655,031 B2
(45) Date of Patent: May 23, 2023

(54) UNMANNED VEHICLE CARGO HANDLING AND CARRYING SYSTEM

(71) Applicant: ELROY AIR, INC., South San Francisco, CA (US)

(72) Inventors: Terik Weekes, San Francisco, CA (US); Isaiah Jones, San Francisco, CA (US); Sean Belardo, San Francisco, CA (US); Clint Cope, San Francisco, CA (US); Colin Owen, San Francisco, CA (US); David Merrill, San Francisco, CA (US)

(73) Assignee: ELROY AIR, INC., South San Francisco, CA (US)

( * ) Notice: Subject to any disclaimer, the term of this patent is extended or adjusted under 35 U.S.C. 154(b) by 0 days.

(21) Appl. No.: 17/664,754

(22) Filed: May 24, 2022

(65) Prior Publication Data
US 2022/0281602 A1 Sep. 8, 2022

Related U.S. Application Data

(62) Division of application No. 16/227,400, filed on Dec. 20, 2018, now Pat. No. 11,447,248.
(Continued)

(51) Int. Cl.
*B64D 1/22* (2006.01)
*B64C 39/02* (2023.01)
(Continued)

(52) U.S. Cl.
CPC ............... *B64D 1/22* (2013.01); *B64C 17/02* (2013.01); *B64C 29/0008* (2013.01);
(Continued)

(58) Field of Classification Search
CPC ... B64D 1/22; B64C 25/405; B64C 2201/128; B66C 1/54; B66C 1/101; B65D 90/0006;
(Continued)

(56) References Cited

U.S. PATENT DOCUMENTS 3,510,107 A 5/1970 Fidler
4,179,149 A 12/1979 Brochard
(Continued)

FOREIGN PATENT DOCUMENTS

| DE | 202014004877 U1 | 7/2014 |
|----|-----------------|--------|
| EP | 2604519 A1 | 6/2013 |
| GB | 777593 A | 6/1956 |

OTHER PUBLICATIONS

Patent Cooperation Treaty Application No. PCT/US2018/057837, "International Search Report and the Written Opinion of the International Searching Authority", Applicant Elroy Air, Inc., dated Jan. 25, 2019.
(Continued)

*Primary Examiner* — Philip J Bonzell
*Assistant Examiner* — Michael B. Kreiner
(74) *Attorney, Agent, or Firm* — Martensen IP; Michael C. Martensen

(57) ABSTRACT

An autonomous cargo container retrieval and delivery system locates a select cargo container and maneuvers an unmanned aerial vehicle proximate to the container for retrieval. The vehicle positions itself to engage the cargo container using a grasping mechanism, and, responsive to engaging the cargo container, retracts the cargo container toward the vehicle. As the cargo container is retracted toward the vehicle, weight sensors within the retrieval mechanism sense the weight and the weight distribution of the cargo container, and, can modify the cargo container's location on the vehicle to optimize vehicle flight operations or replace the container on the ground and alert the operator that the cargo container is too heavy or has an improper weight distribution. Upon mating the cargo container with the vehicle, a coupling mechanism latches or secures the
(Continued)

cargo container to the vehicle for further flight and/or ground operations.

17 Claims, 16 Drawing Sheets

Related U.S. Application Data

(60) Provisional application No. 62/610,659, filed on Dec. 27, 2017, provisional application No. 62/609,107, filed on Dec. 21, 2017.

(51) Int. Cl.
*B64C 17/02* (2006.01)
*B64C 29/00* (2006.01)
*B64U 10/13* (2023.01)
*B64U 101/60* (2023.01)

(52) U.S. Cl.
CPC ............ *B64C 39/024* (2013.01); *B64U 10/13* (2023.01); *B64U 2101/60* (2023.01)

(58) Field of Classification Search
CPC .............. B65D 90/0013; B65D 90/002; B65D 90/0026; B65D 90/0033; B25J 15/0047
See application file for complete search history.

(56) References Cited

U.S. PATENT DOCUMENTS

| | | | |
|---|---|---|---|
| 5,573,367 A | 11/1996 | Erickson |
| 5,660,422 A | 8/1997 | Knisley |
| 5,961,071 A | 10/1999 | Proctor |
| 6,293,491 B1 | 9/2001 | Wobben |
| 8,128,026 B2 | 3/2012 | Shelton |
| 8,393,564 B2 | 3/2013 | Kroo |
| 8,579,234 B2 | 11/2013 | Thompson |
| 8,840,355 B1 | 9/2014 | Kulesha |
| 8,960,468 B2 | 2/2015 | Boivin |
| 8,991,751 B2 | 3/2015 | Page et al. |
| 9,550,567 B1 | 1/2017 | Erdozain, Jr. et al. |
| 10,040,553 B2 | 8/2018 | Frolov et al. |
| 10,059,442 B2 | 8/2018 | Olm et al. |
| 10,336,543 B1 | 7/2019 | Sills |
| 2007/0200032 A1 | 8/2007 | Eadie |
| 2009/0014583 A1 | 1/2009 | Shelton |
| 2009/0146010 A1 | 6/2009 | Cohen |
| 2013/0020429 A1 | 1/2013 | Kroo |
| 2014/0048653 A1 | 2/2014 | Thompson |
| 2015/0136897 A1 | 5/2015 | Seibel |
| 2016/0207625 A1 | 7/2016 | Judas |
| 2016/0229534 A1 | 8/2016 | Hutson |
| 2016/0236774 A1 | 8/2016 | Niedzballa |
| 2017/0029104 A1 | 2/2017 | Kim |
| 2017/0203842 A1 | 7/2017 | Viaud et al. |
| 2017/0267347 A1 | 9/2017 | Rinaldi et al. |
| 2017/0300065 A1 | 10/2017 | Douglas |
| 2017/0300067 A1 | 10/2017 | Douglas |
| 2017/0313421 A1 | 11/2017 | Gil |
| 2018/0244389 A1 | 8/2018 | Herlocker |
| 2018/0305005 A1 | 10/2018 | Parks |
| 2020/0087121 A1 | 3/2020 | Ohayon |
| 2020/0108927 A1 | 4/2020 | Bosworth |
| 2020/0207474 A1 | 7/2020 | Foggia |
| 2021/0011492 A1 | 1/2021 | Raabe |

OTHER PUBLICATIONS

Patent Cooperation Treaty Application No. PCT/US2018/067020, "International Search Report and the Written Opinion of the International Searching Authority", Applicant Elroy Air, Inc., dated Mar. 18, 2019.

Patent Cooperation Treaty Application No. PCT/US2018/057837, "International Preliminary Report on Patentability" Applicant Elroy Air, Inc., dated Apr. 28, 2020.

Patent Cooperation Treaty Application No. PCT/US2020/027846, "International Search Report and Written Opinion of the International Searching Authority", Applicant Elroy Air, Inc., dated Sep. 23, 2020.

Patent Cooperation Treaty Application No. PCT/US2018/067020, "International Preliminary Report on Patentability" Applicant Elroy Air, Inc., dated Jun. 23, 2020.

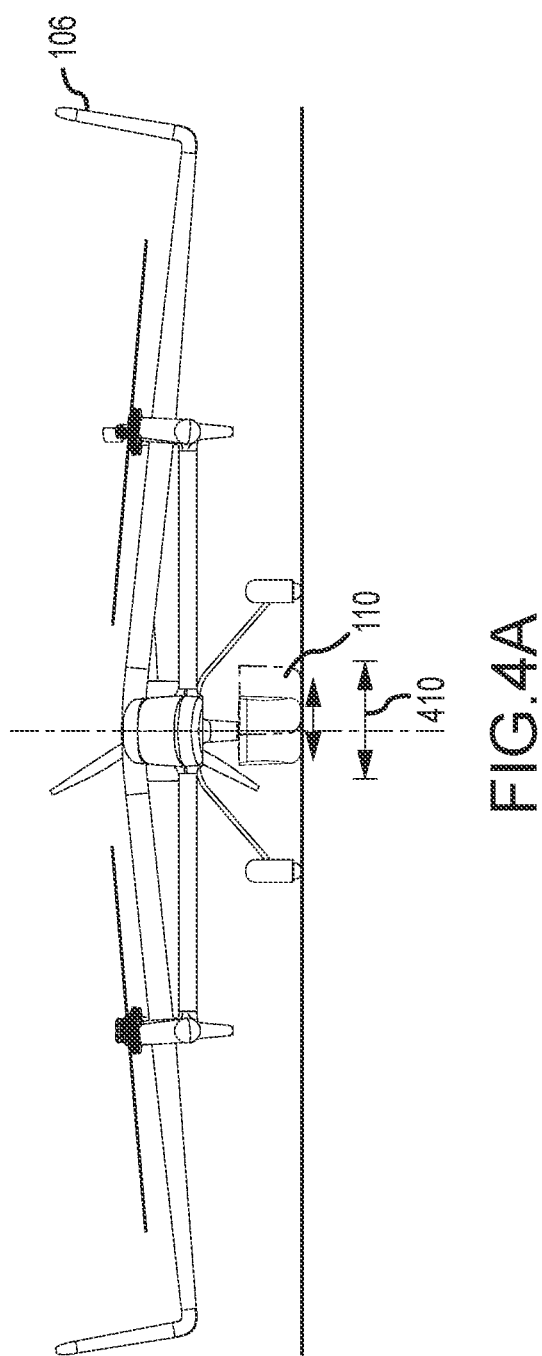

UNMANNED VEHICLE CARGO HANDLING AND CARRYING SYSTEM

RELATED APPLICATION

This application is a divisional application of U.S. Utility patent application Ser. No. 16/227,400 filed 20 Dec. 2018, which relates to and claims the benefit of priority to U.S. Provisional Patent Application Nos. 62/609,107 filed 21 Dec. 2017 and 62/610,659 filed 27 Dec. 2017, all of which are hereby incorporated by reference in their entirety for all purposes as if fully set forth herein.

BACKGROUND OF THE INVENTION

Field of the Invention

The invention pertains to the design of unmanned aerial vehicles and more specifically, to autonomous retrieval and delivery of cargo using unmanned aerial vehicles.

Relevant Background

Unmanned aerial vehicles (UAVs) are becoming increasingly feasible as a means for commercial and military cargo delivery. Commercially, UAVs will be used to deliver individual packages or groups of packages to customers or distribution centers when roads are an inefficient or inaccessible means of transport. For defense, UAVs will be used to resupply soldiers that are geographically distant from operating bases when a ground vehicle or traditional air resupply is dangerous or inefficient.

While the execution of flight plans (takeoff, navigation from one waypoint to the next until reaching the destination, sensing-and-avoiding other aircraft, landing) is becoming increasingly routine, user-friendly and automated, ground operations—the loading and unloading of cargo, guaranteeing the safety of people around the UAV and the safety of the UAV itself—remain a challenge.

Cargo-carrying UAVs today typically require a degree of manual loading and unloading of carried packages. Some, like the fixed-wing UAVs flown by Zipline, parachute-drop their cargo at the destination, avoiding the need to land for delivery. Others, like the delivery drones flown by Amazon, have the ability to lower then automatically detach a cargo container or shipping box, allowing the UAV to immediately return to its place of origin such as a distribution center or delivery truck. While interesting from a marketing perspective, these systems cannot provide sufficient throughput to make them a cost-effective means by which to deliver cargo.

In order to permit high-throughput air cargo via UAV there is a need for a UAV cargo system that can reduce the amount of human involvement required to load and unload the carried cargo.

The safety of nearby humans around a UAV when it is on the ground is typically accomplished via a tightly scripted operator process and a high level of operational diligence. For example, verbal signals that are issued by the UAV operator before starting the rotors spinning or taking off. The UAV system itself typically has little to no awareness of nearby people, which necessitates these processes to ensure safety.

In order to allow people to work near a large autonomous UAV safely there is a need for mechanisms to allow the UAV to be aware of the presence of nearby people and to guarantee that it will not harm them with its rotors or movements. Nonetheless a high-throughput UAV must retrieve and depart with cargo with minimal operator interaction to achieve a high-throughput and cost-effective autonomous cargo delivery system. These deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A system, and associated methodology, to autonomously retrieve and deliver a cargo container is hereafter disclosed. According to one embodiment of the present invention an unmanned vehicle navigates on the ground to the proximity of a cargo container designated for retrieval. Upon arriving in the cargo container's vicinity, on-board systems collect data with respect to the local environment surrounding the cargo container to ascertain the cargo containers location, position and orientation. Using this information the vehicle positions itself astride the cargo container and deploys a grasping mechanism to engage and retrieve the cargo container. Upon mating the cargo container with the vehicle, the container is securely affixed to the vehicle for further ground and/or flight operations.

According to one embodiment of the present invention, a system for autonomous retrieval and delivery of cargo includes a vehicle and a plurality of devices associated with the vehicle wherein the plurality of devices collect information regarding an environment proximate to the vehicle. These devices can include LIDAR, radio-frequency ranging transceivers, optical systems, GPS, and the like. The system further includes a cargo container that is distinct from the vehicle yet is couplable to the vehicle. A grasping mechanism extends from the vehicle and engages the cargo container and, responsive to the grasping mechanism engaging the cargo container, a retraction and extension mechanism retracts (or extends in other embodiments) the cargo container (also referred to herein as a cargo pod) towards (away from) the vehicle. Lastly, a coupling mechanism detachably affixes the cargo container to the vehicle when the retracting and extension mechanism mates the cargo container to the vehicle.

In one version of the present invention the vehicle is an Unmanned Aerial Vehicle ("UAV") that has one or more motors associated with its landing gear assembly ("landing gear") by which to move and position the UAV in proximity to the cargo container. In another version of the present invention, the system includes a vehicle control system that analyzes the collected data and issues commands to various components to position the UAV, grasp, retrieve, and attach the cargo container. The vehicle control system includes a machine capable of executing instructions embodied as software and a non-transitory storage medium housing a plurality of software portions. One of the software portions is configured to identify the cargo container within the environment while another configured to position the grasping mechanism within a predetermined degree of alignment of the cargo container. In one version of the present invention the predetermined degree of alignment allows for +/−6.75" of lateral error, +/−7.5" of longitudinal error, and 11 degrees of angular error.

In yet another embodiment of the present invention, the vehicle includes a vehicle center of gravity and wherein the cargo container includes a cargo container center of gravity and wherein, responsive to the cargo container being coupled with the vehicle, one of the software portions is configured to modify the vehicle center of gravity based on the cargo container center of gravity. In one version of the present invention, the retraction and extension mechanism includes two or more flexible cables, lines, straps or the like configured to suspend the cargo container, aligning the cargo container with the vehicle. The retraction and extension mechanism of the invention includes a plurality of cables or the like and each cable is associated with a weight sensor. Using the sensors associated with each cable, the cargo container's total weight and weight distribution is determined.

In addition, the total weight and the distribution of the cargo container weight are communicated to the vehicle control system to determine whether the center of gravity of the vehicle is adversely affected by the addition of the cargo container and whether the total weight is within acceptable limits. In another version of the invention, the position of the cargo container as it is affixed to the vehicle, is modified based on the center of gravity computations and in yet another embodiment, internal UAV weight and/or components are shifted to compensate to maintain the center of gravity within predefined limits. For example fuel can be shifted from one storage tank to another to maintain or optimize the vehicle's center of gravity.

Another embodiment of the present invention provides a method for autonomous retrieval and delivery of cargo beginning with collecting information regarding an environment proximate to a vehicle wherein the environment includes a cargo container. The collected data aids in determining an orientation of the cargo container and the positioning of the vehicle in proximity with the cargo container to facilitate coupling the cargo container to the vehicle.

Other aspects of the methodology of the present invention include determining geospatial location of the vehicle and the cargo container using the GPS system, a radio frequency positioning system, cameras or other optical sensors. These devices provide the system with data for identifying the orientation of the cargo container with respect to the vehicle. Included in this process is locating the grasping mechanism proximate to the cargo container and within a predetermined amount of alignment error to the cargo container.

Thereafter the grasping mechanism extends from the vehicle to engage and retract the cargo container. The retraction mechanism senses the cargo container total weight and weight distribution. Finally, the process concludes with latching/affixing the cargo container to the vehicle.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
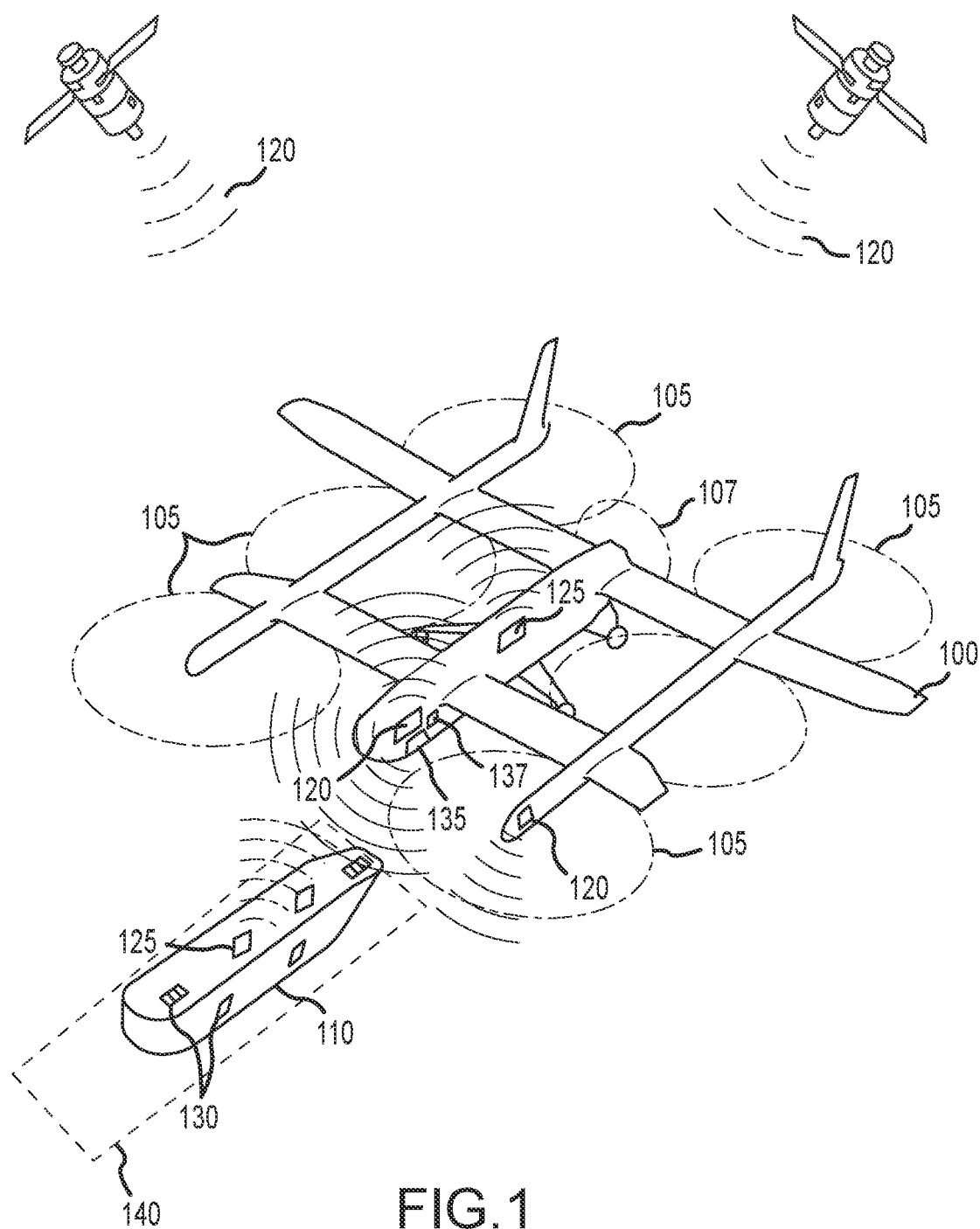
FIG. 1 is a left front perspective view of a UAV approaching a cargo container for autonomous retrieval and delivery of cargo, according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

An autonomous cargo container retrieval and delivery system locates a select cargo container and maneuvers an unmanned aerial vehicle proximate to the container for retrieval. Recognizing the location and orientation of the cargo container, the vehicle positions itself to engage the cargo container using a grasping mechanism. Responsive to engaging the cargo container, the grasping mechanism, in conjunction with a retrieval mechanism retracts the cargo container toward the vehicle. As the cargo container is retracted toward the vehicle, weight sensors within the retrieval mechanism sense the total weight and the weight distribution of the cargo container. Upon mating the cargo container with the vehicle, a coupling mechanism latches or secures the cargo container to the vehicle for flight and/or ground operations.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, a reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of reasonable skill in the relevant art that references to a structure or a feature that is "adjacent" to another feature may have portions that overlap or underlie that feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used to autonomously retrieve and deliver a cargo container as well as reposition the cargo container relative to the vehicle to manipulate the vehicle's center of gravity. In the following description, it will be understood that each block of the flowchart illustrations, and combinations of blocks in the flowchart illustrations, can be implemented by computer program instructions in combination with physical components. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware and/or computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for autonomous retrieval and delivery of cargo containers through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the invention.

The realization and practical application of autonomous delivery of cargo are predicated on the ability to achieve sufficient throughput that makes such a system economical and profitable. Throughput is maximized by achieving a high level of utilization of vehicle assets, and high utilization depends on efficient loading/unloading logistics at each end of a haul. The system and associated methodologies of the present invention achieve efficient loading/unloading logistics in part by autonomously identifying, retrieving and depositing cargo containers at the beginning and end of missions.

According to one embodiment of the present invention, a vehicle such as an unmanned aerial vehicle receives information as to the geospatial location of a cargo container designated for retrieval. Knowing its geospatial location relative to that of the cargo container and data with respect to the environment in which it operates, the vehicle repositions itself to the general locale of the cargo container.

Once in the vicinity of the cargo container designated for retrieval, on-board sensors supply the vehicle with data regarding its immediate environment. Sensors such as LIDAR, UWB RADAR, Two-way transceivers, GPS and similar devices enable the vehicle to construct a picture of a local environment including a cargo container.

Recognizing the cargo container, its location, and its orientation, or having received prior accurate information of the location and orientation of the cargo container, the vehicle positions itself proximate to the container within predetermined tolerances whereby a grasping mechanism can engage the container. Once engaged the container is retracted toward the vehicle until contact is made whereby the cargo container is secured/affixed to the vehicle.

FIG. 1 presents a front right perspective view of a vehicle, in this case, an unmanned aerial vehicle, in relation to a cargo container designated for retrieval.

In one embodiment of the present invention, the UAV 100 operates at a transportation hub, airport, cargo facility or similar terminal at which a plurality of vehicles are marshalling. Upon arriving at the terminal, the UAV 100, in one embodiment, terminates operation of rotors or other propellers and repositions itself using motors associated with the vehicle's landing gear. In this version of the invention, each main landing gear wheel is associated with an independent electric motor. Using differential signals to each wheel and a steerable rear wheel, the vehicle can maneuver about the terminal. Having a map or internal data with respect to the layout of the terminal as well as an ability to identify its location at the terminal using GPS or similar positional determination technology as would be known by one of reasonable skill in the art, the vehicle can reposition itself from one location to another. In other embodiments of the present invention, the vehicle shares its location with a central facility management system and/or other nearby vehicles to deconflict and safely manage the movement of vehicles and objects (cargo containers) at the terminal facility.

FIG. 1 presents one version of the present invention in which an unmanned aerial vehicle 100 identifies its location relative to a cargo container 110 in a local environment. In one embodiment, the vehicle uses on-board systems to determine a path by which to arrive in proximity to the designated cargo container. In most instances the UAV will taxi using preexisting taxiways and designated routes from its current location to the staging area for cargo retrieval.

The cargo container 110, according to one embodiment of the present invention, is a self-contained vessel which is compatible with the UAV 100. The container can be preloaded with cargo and prepositioned for retrieval in designated staging areas. For example, a worker can load a cargo container with cargo and positioning it within a predefined area in a staging area. Once placed in the staging area, the cargo container can be designated as ready for retrieval. In other embodiments, a robot or similar mechanism can place the cargo container in the staging area.

In the embodiment shown in FIG. 1, the cargo container 110 is an elongated vessel that is configured to hold cargo internally. The container is shaped to mate with the lower portion of a UAV with minimal impact on the UAV's ability to conduct aerial operations.

FIG. 1 depicts a UAV having 6 rotors 105 and a single pusher propeller 107 to facilitate vertical and horizontal flight. However, during ground operations, the rotors and propellers are parked (secured) and all movement is conducted via motors associated with each wheel. In this embodiment, a reverse tricycle configuration is used in which each main wheel is associated with an independent motor. The trailing rear wheel is steered using a third motor. In other embodiments the trailing rear wheel is free to caster.

As the UAV approaches the staging area on-board devices 120 sense the environment including the cargo container 110. The UAV positions itself atop the cargo container so that ultimately the cargo container is positioned directly below the UAV.

A plurality of devices 120 on-board the vehicle provide data to assist the UAV to place itself in a position whereby it can grasp and retrieve the cargo container. According to one embodiment of the present invention, both the UAV and the cargo container are equipped with GPS receivers 125 that can provide fine resolution of not only the location of the cargo container relative to the UAV but also its orientation. In other embodiments, the cargo container can possess fiducial markers 130 that are recognized by optical systems 135 resident on the UAV. A fiducial marker or fiducial is an object placed in the field of view of an imaging system which appears in the image produced, for use as a point of reference or a measure.

As the UAV approaches the cargo container, an optical system can detect markers located at strategic locations on the cargo container. In FIG. 1, the cargo container is shown to possess 5 separate markers 130 that can be analyzed by the on-board optical system 135 of the UAV. Using an optical system 135, comprised of cameras and associated instructions executed by the vehicle control system, the UAV recognizes the cargo container 110, its identity, as well its location and orientation and can make fine adjustments of the UAV's position to facilitate retrieval of the cargo container.

In another embodiment, the cargo container and UAV use two-way radio frequency, time of flight calculations to determine the cargo container's position relative to the UAV. In one embodiment the cargo container includes a plurality of transceivers (not shown) located at key points on the container. By using Two Way Ranging and Time Distance of Arrival calculations, a precise location of an object can be determined within a geographic area. Using such a technique, the present invention can identify the position and orientation of the cargo container relative to the UAV with high accuracy.

In other embodiments, a LIDAR system 137 can be employed to provide relative distance data between the UAV and the cargo container. LIDAR (also called Lidar, LiDAR, and LADAR) is a surveying method that measures distance to a target by illuminating the target with pulsed laser light and measuring the reflected pulses with a sensor.

Yet another version of the present invention includes the placement of the pod in a precise position and orientation. For example clear and definitive outlines 140 or depressions can be placed on (in) the ground to ensure that the container's position and location is predetermined. As the vehicle approaches it merely needs to understand its position with respect to a fixed geographic point. Upon reaching that point, and with the cargo container precisely positioned at its location, the vehicle can begin the collection/grasping process without actually sensing or identifying the cargo container. In this approach the vehicles first awareness of the presence of the cargo container would be with the grasping mechanism makes initial contact with the cargo container.

As will be readily apparent to one of reasonable skill in the relevant art, the present invention integrates devices capable of capturing and providing spatial data to the vehicle for analysis and action. While several systems have been presented herein, one of reasonable skill in the relevant art will recognize that other sensors and data collection systems are viable alternates and contemplated within the scope of the present invention.

One aspect of the present invention during the retrieval of a cargo container by a vehicle is using increasingly accurate means by which to identify and modify the relative spacing and orientation separating the two objects. Recall that the vehicle must first locate itself on a terminal or similar environment and navigate to be proximate to a cargo container designated for retrieval. And upon arriving at the staging area the vehicle must refine its position based on the local conditions.

Figure 2:
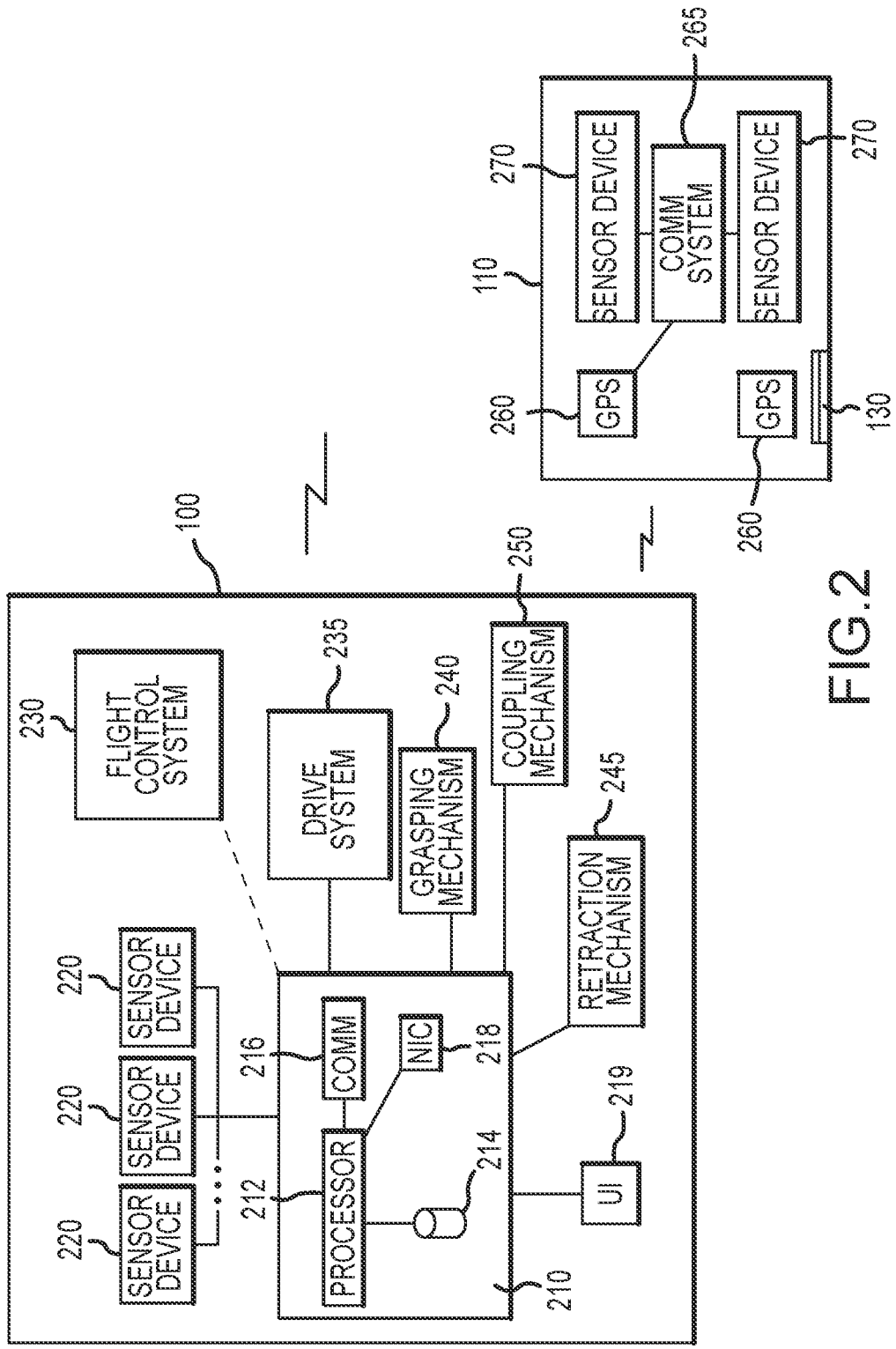
FIG. 2 is a high-level block diagram of a system for autonomous retrieval and delivery of cargo, according to one embodiment of the present invention.

The vehicle's ability to collect and analyze data and position itself so as to retrieve a designated or select cargo container is managed by a vehicle control system. FIG. 2 shows a high-level block diagram of a vehicle control system according to one embodiment of the present invention.

As shown, the vehicle control system 210 comprises a central processing unit(s) (CPU) or processor(s) 212 coupled to a random-access memory (RAM), a read-only memory (ROM), a removable (mass) storage device (e.g., floppy disk, CD-ROM, CD-R, CD-RW, DVD, or the like), a fixed (mass) storage device 214 (e.g., hard disk), a communication (COMM) port(s) or interface(s) 216, a network interface card (NIC) 218 or controller (e.g., Ethernet) and a user interface, (UI) 219. Although not shown separately, a real-time system clock is included with the system, in a conventional manner.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include microcontrollers with memory (such as electronically erasable programmable read-only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy logic (in neural networks), quantum devices, and hybrids of any of the above device types.

Communicatively coupled to the vehicle control system are a plurality of devices 220 operable to collect data with respect to the vehicle's location, surrounding environment, operation and status. Similarly, the vehicle control system 210 is communicatively coupled to the flight control system 230 for airborne operations and to the drive system 235 of ground operations. Lastly, the vehicle control system 210 integrates with the grasping mechanism 240, the retraction and extension mechanism 245 and the coupling mechanism 250.

FIG. 2 also presents a block diagram of a cargo container 110. While in one embodiment the cargo container is a passive device and may only include fiducials 130 located on the container's exterior, in other embodiments the container includes a GPS receiver 260 and/or communication devices 265 to convey its location to a facility management system and/or directly to a vehicle's vehicle control system. Similarly, the cargo container may include a plurality of transceivers 270 by which two-way ranging between the cargo container and the vehicle can be accomplished. Indeed, by placing two more transceivers or GPS receivers 260 on the cargo container the location and orientation of the cargo container relative to the vehicle can be determined. Additionally, the cargo container's communication system can transmit data such as its location, state and orientation to both vehicles and the facility management system.

Figure 3A:
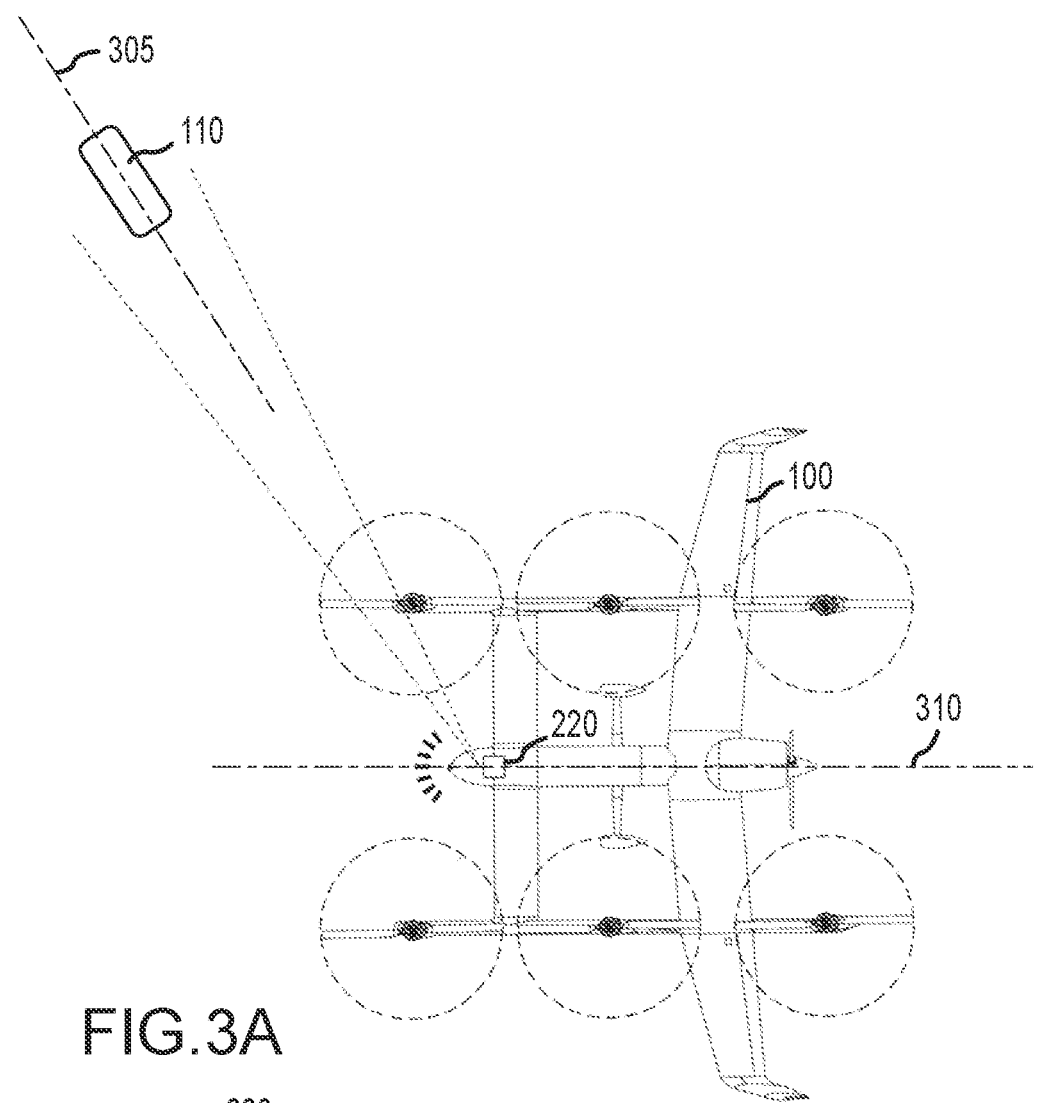
FIGS. 3A, and 3C are a top and side view, respectively, of a UAV in proximity to a cargo container
Figure 3B:
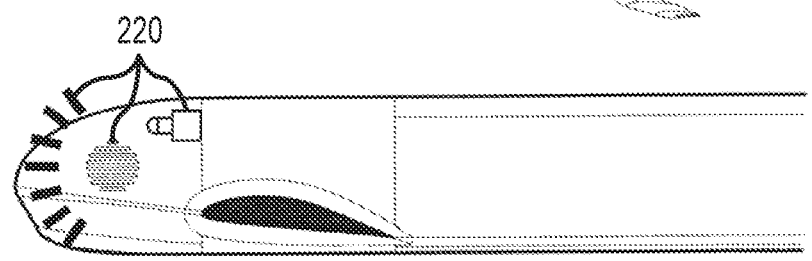
FIG. 3B is an expanded side view of a sensor suite located in the nose of the UAV, according to one embodiment of the present invention.
Figure 3C:
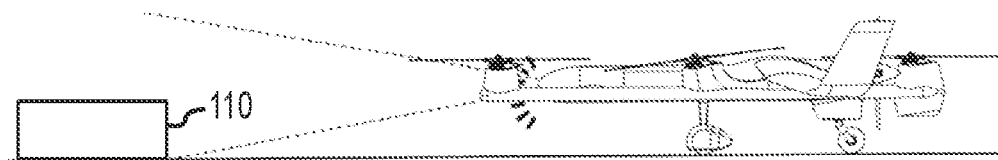

As the UAV 100 arrives near the staging area and as depicted in FIG. 3A, the on-board devices (sensors) 220 gather data with respect to the local environment to positively identify the cargo container 110 and determine the container's orientation relative to the vehicle. As illustrated in FIG. 1 and FIG. 3A, the cargo container 110 may be within the staging area but not perfectly aligned with the vehicle 100. Using a plurality of on-board devices 220 shown in FIG. 3B, the vehicle 100 positions itself within a predetermined degree of alignment.

Once astride the cargo container as shown in FIGS. 4A-4D, and according to one embodiment of the present invention, a grasping mechanism, in association with an extension and retrieval mechanism, is dispatched from the undercarriage of the UAV. As described herein, the grasping mechanism is coupled to the extension and retrieval mechanism by two or more cables. As the grasping mechanism contacts the cargo container the cables go slack or less weight is sensed than is normal for the grasping mechanism at the extension and retrieval mechanism. Once contact with the cargo container is established, the grasping mechanism extends longitudinally to engage the container.

FIGS. 4A-4D presents front and side views, respectively, of retraction and retrieval of a cargo container according to one embodiment of the present invention. Similarly, FIG. 5 presents a side perspective view of the grasping mechanism as it interacts and engages the cargo container. Referring conjunctively to FIGS. 4A-D and FIG. 5, the vehicle 100, a UAV in this example, positions itself astride the prepositioned cargo container 110. In perfect conditions, the cargo container's longitudinal centerline 305 would be aligned with the longitudinal axis (centerline) of the vehicle 310. Similarly, in perfect conditions, the vehicle would position itself fore and aft 430 along the longitudinal axis to place the cargo container directly below the grasping mechanism. Unfortunately, perfect conditions do not always exist.

The present invention provides a means by which a vehicle, such as a UAV, can, with increasing accuracy, position itself within the proximity of a cargo container. At a starting point, the UAV and cargo container may be separated by a significant distance. Using on-board systems, the UAV can identify its geospatial location and receive data wirelessly with respect to the location and identity of a designated cargo container for retrieval.

With the UAV location and the location of the cargo container in-hand, the UAV determines a path by which to relocate to the cargo container's proximity. As the UAV arrives within a predetermined distance of the cargo container on-board devices are triggered to detect the cargo container and refine the UAV's relative position and orientation.

For example, assume a preloaded cargo container is placed on a loading platform at an air terminal. The loading platform provides an outline region on the tarmac in which the cargo container is preferably located, however exact placement is not guaranteed. At the same time a UAV, having returned from a recent delivery, has been tasked to retrieve the recently prepositioned cargo container and delivery to a distant location.

The UAV includes a GPS receiver that provides its vehicle control system with the UAV's location. The UAV also includes data with respect to suitable pathways on which to navigate once it arrives at the air terminal. Using the UAV's communication capability, the UAV receives instructions to retrieve the cargo container, the cargo container's identity and the cargo container's location at the air terminal.

With such information, the UAV autonomously navigates to the proximity of the cargo container, while avoiding other UAV and obstacles. To do so the UAV uses on-board devices (sensors) to identify obstacle or hazards that may interfere with its ability to reach the location of the cargo container or present unsafe operating conditions.

As the UAV nears the proximity of the cargo container, on-board devices provide local data to the UAV with more detailed information about the cargo container's location and orientation. Using the collected data, the UAV positions itself astride the container, aligned with the centerline (longitudinal axis) of the cargo container to the best of its ability. Using motors driving wheels on each main landing gear and, in one embodiment, a motor to steer the rear wheel, the UAV makes fine adjustments with respect to its alignment so as to rest astride the cargo container within a predetermined degree of alignment. In one embodiment of the present invention, the predetermined degree of alignment is +/−6.75" of lateral error 410, +/−7.5" of longitudinal error 420, and 11 degrees of angular error 1145. Recall that the primary driver for the predetermined degree of alignment is the ability of the grasping mechanism to make contact with the cargo container and engage the support cross-bars. According, as the size of the cargo container varies, the predetermined degree of alignment will correspondingly change.

Figure 4B:
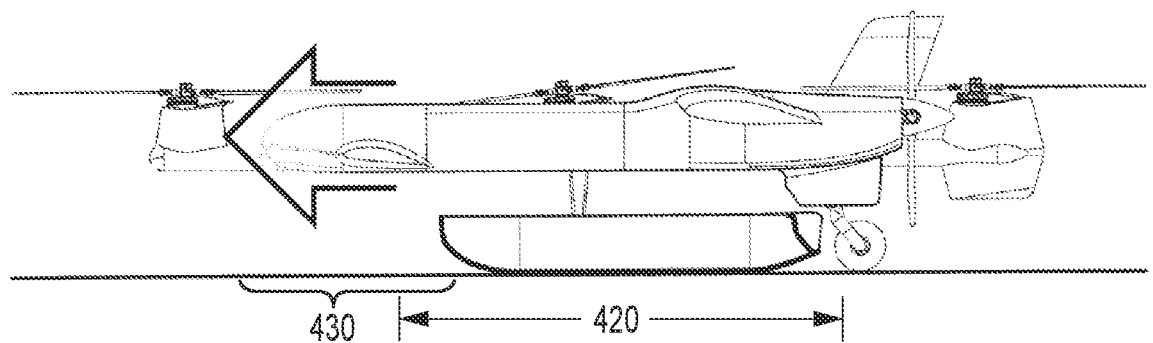
FIGS. 4A, 4B. 4C and 4D are front and side views, respectively, of an unmanned aerial vehicle positioned for retrieval of a cargo container according to one embodiment of the present invention.
Figure 4C:
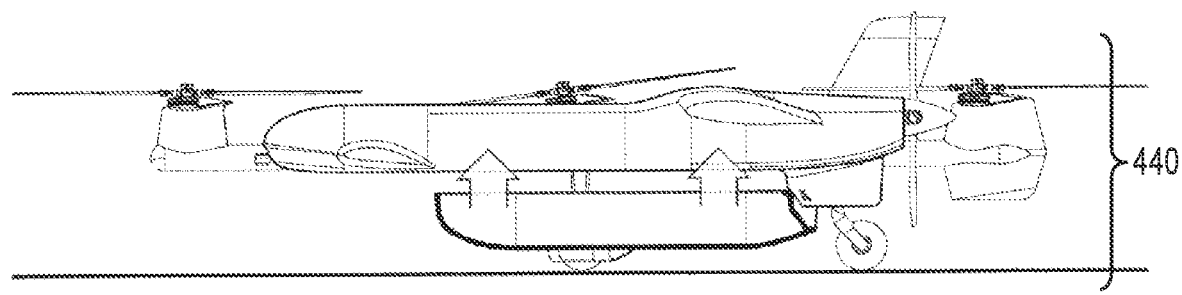
Figure 4D:
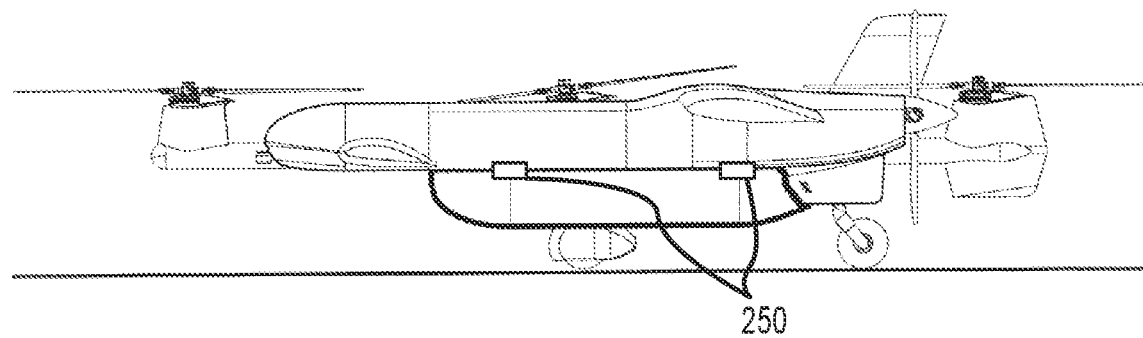
Figure 5:
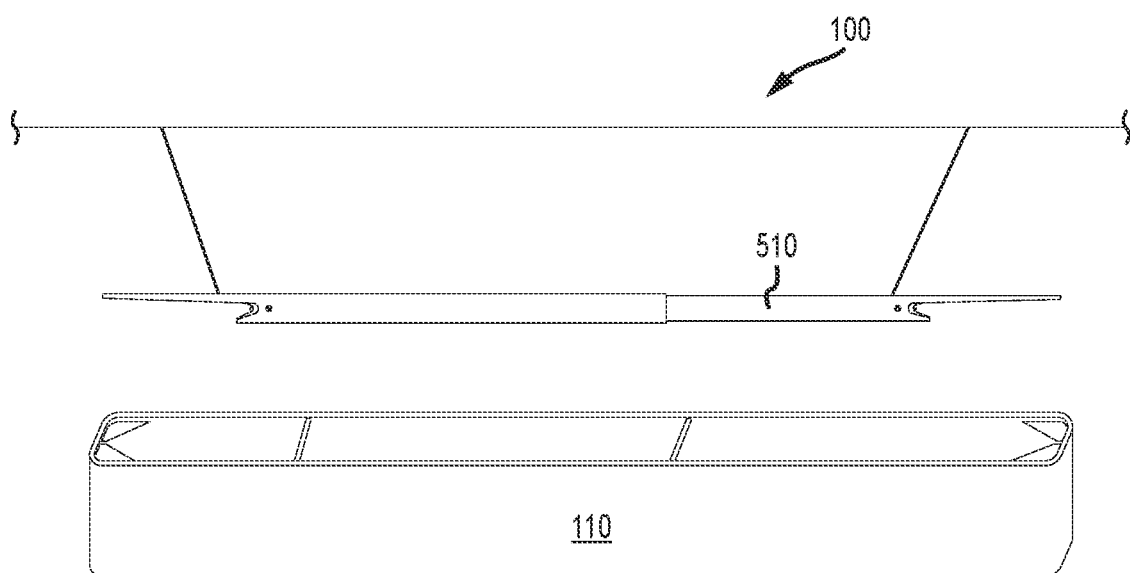
FIG. 5 is a perspective view of a grasping and retrieval mechanism relative to a cargo container, according to one embodiment of the present invention.

As depicted in FIGS. 4B-C, once positioned, a grasping mechanism lowers, engages the cargo container, and retracts 440 the cargo container toward the UAV whereby it is coupled to the UAV for flight operations as shown in FIG. 4D.

A side view of one embodiment of a grasping mechanism 510, according to the present invention, is shown in FIG. 5. In the example shown in FIG. 5 the grasping mechanism 510 is extended from the lower portion of the central fuselage of the UAV 100. One of reasonable skill in the relevant art will recognize that other configuration with respect to the location of the grasping mechanism as associated with the vehicle are possible and indeed contemplated. For example, in other embodiments a UAV may have the capacity to carry multiple cargo containers, or have the ability to carry asymmetrical loads on outboard stations of the UAV. In another embodiment, grasping mechanisms are located on each lateral boom enabling a UAV to carry 2 or more cargo containers. All of these and other embodiments are contemplated with respect to the present invention and are to be viewed as within the scope of the present disclosure.

Figure 6A:
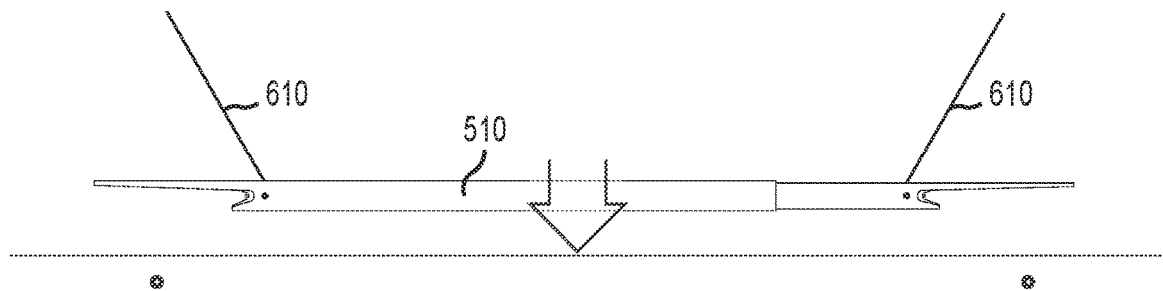
FIGS. 6A, 6B and 6C are side views of a first version of a grasping mechanism, according to one embodiment of the present invention, as it interacts and engages support structure of the cargo container.
Figure 6B:
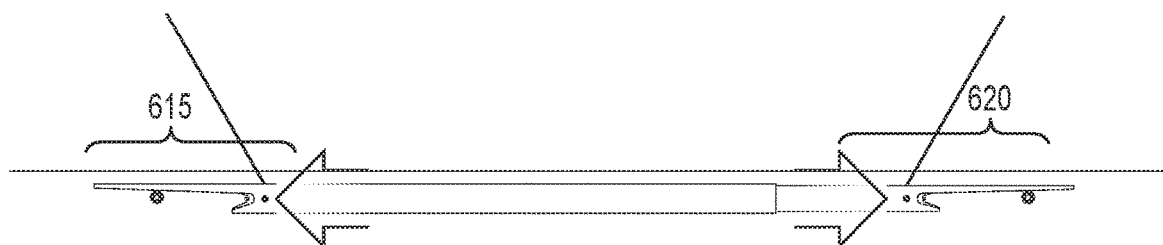
Figure 6C:
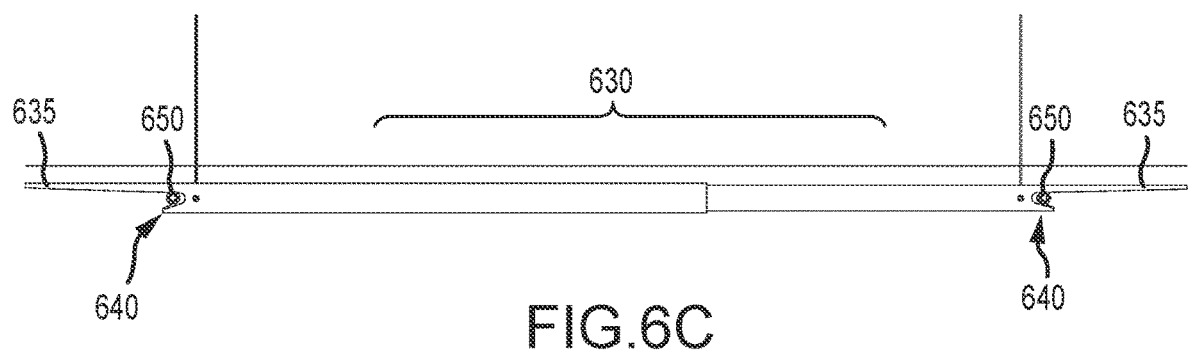

As shown in FIG. 6 the grasping mechanism 510 extends from the vehicle on the cable system. The grasping mechanism comprises a substantially longitudinal member that is suspended from the vehicle by two or more cables, webbing strap, or the like 610. Each cable is flexible and enables the grasping mechanism to dangle freely under the vehicle prior to making contact with the cargo container. The mechanism's longitudinal member includes a front 615 and a rear 620 portion interposed by a central expansion section 630. The expansion section enables the grasping device to lengthen longitudinally upon contact with the cargo container. In one embodiment the design of the expansion mechanism is substantially tubular, having overlapped concentric tubes with a central screw or worm gear to extend and contract the mechanism. When extended from the vehicle, the grasping mechanism is withdrawn or compressed longitudinally and at its minimal length.

Each end of the grasping mechanism includes, in one embodiment, an elongated bill 635 or beak shape on the grasping mechanisms upper edge. The elongated bill resolves to a "C" or "U" shaped mouth 640. After the grasping mechanism makes contact with the cargo container, it extends longitudinally in length. A structural component of the cargo container 650 interacts with the grasping mechanism within the "C"/"U" cavity of the grasping mechanism. The upper bill portion supports the grasping mechanism until the cargo container's structural component presents itself to the base of the "C"/"U" cavity. In other versions internal cross-bars support the grasping mechanism prior to engaging the structural components. One of reasonable skill in the relevant art will appreciate that the dimensions and the proportions of the elongated bill and the shorter lower portion may vary and are shown, in these figures, as demonstrative examples.

FIGS. 7A, 7B, 7C and 7D present a second version of the grasping mechanism according to one embodiment of the present invention. As with the prior version, an elongated structure is dispatched from the undercharge of the vehicle in a contracted stated and suspended by a strap, webbing, cable or similar flexible material. Each end of the grasping mechanism comprises a "C" or "U" opening 640 which is configured to engage a support structure 650 resident on the cargo container.

Figure 7A:
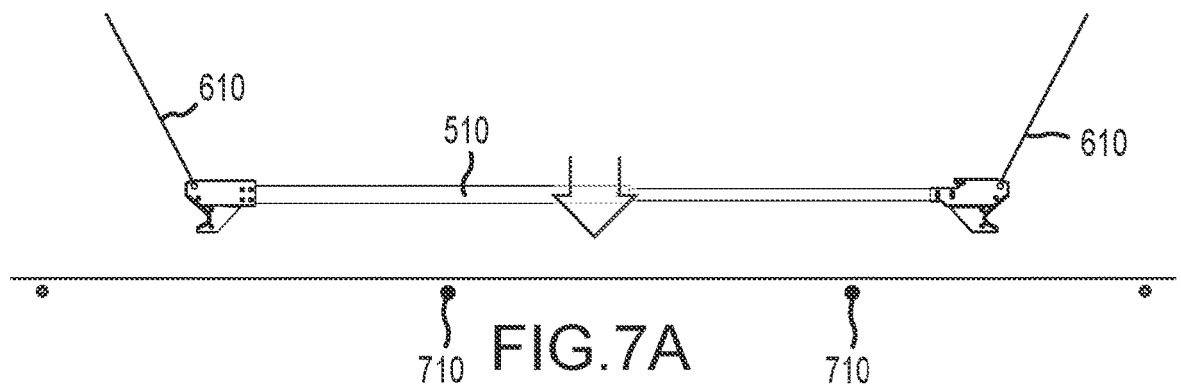
FIGS. 7A, 7B, 7C and 7D are side views of a second version of a grasping mechanism, according to one embodiment of the present invention, as it interacts and engages support structure of the cargo container.
Figure 7B:
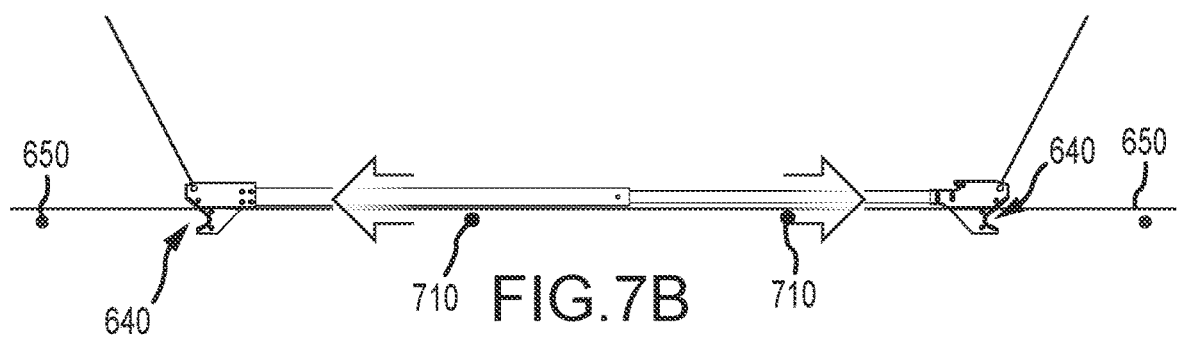

As shown in FIG. 7A the grasping mechanism 510 descends from the vehicle in a shortened/contracted state so that the openings are inside each cargo container support structure. Two or more cross-bars 710 support the central portion of the grasping mechanism and enabling it to rest on the cargo container as shown in FIG. 7B prior to engaging the support structure.

Figure 7C:
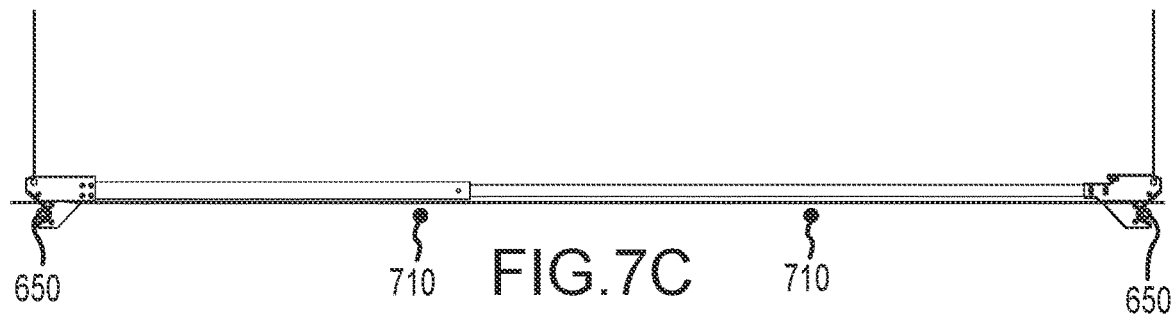
Figure 7D:
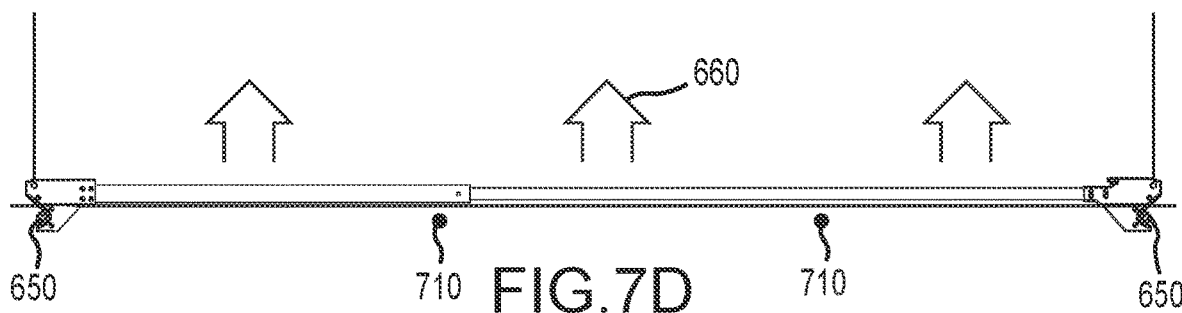

Thereafter the grasping mechanism extends, as shown in FIG. 7C, until "C" or "U" shaped opening 640 engages each of the cargo container's support structures 650. In this version of the grasping mechanism a positive force is exerted by the grasping mechanism against each support structure 650 to ensure each opening remains engaged. With the grasping mechanism fully engaged with the support structures of the cargo container, the grasping mechanism and the cargo container are retracted 660 toward the undercarriage of the vehicle as shown in FIG. 7D.

Figure 8A:
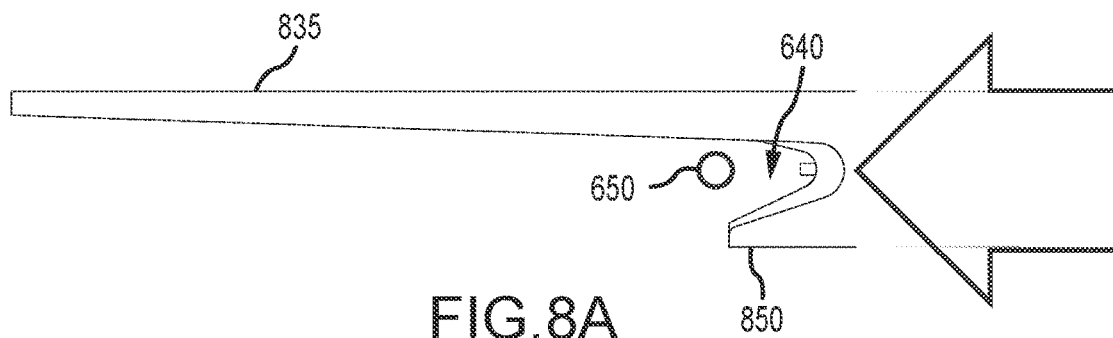
FIGS. 8A, 8B and 8C are an expanded view of the interaction and locking mechanism of the grasping arm and support structure of the cargo container, according to one embodiment of the present invention.
Figure 8B:
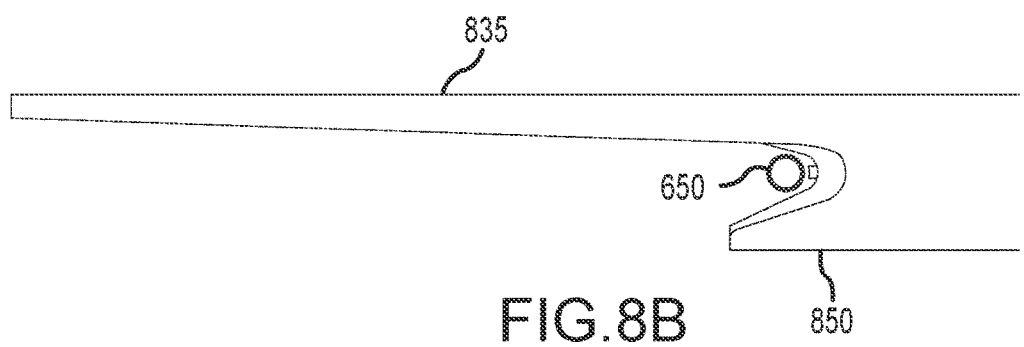
Figure 8C:
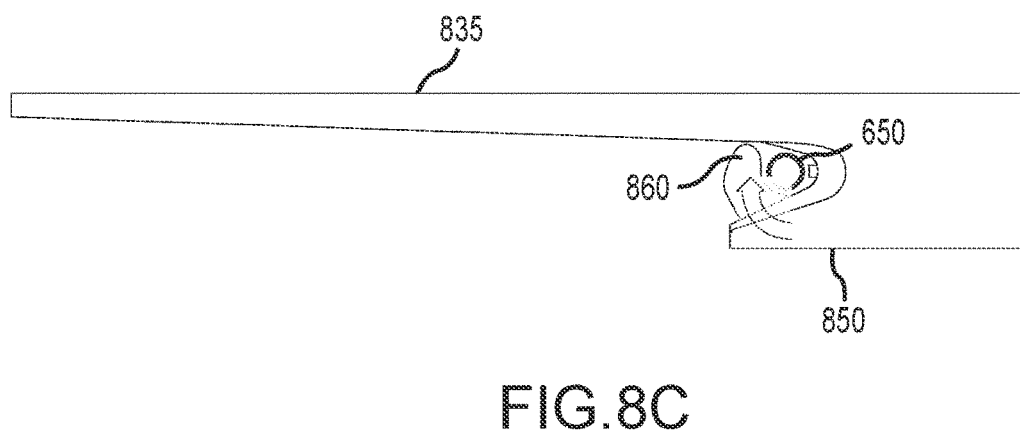

FIGS. 8A-8C is an expanded view of one end of the first version of the grasping mechanism, according to one embodiment of the present invention. Shown in FIG. 8 are the elongated bill 835 and shorter lower extension 850 that forms a "C" or "U" shaped cavity 640 at the end of the grasping mechanism. A side cutaway view of a cargo container structural component is also shown.

As the structural component 650 is guided into the "C" or "U" shaped cavity 640 a sensor at the base of the cavity detects when the cavity has engaged the structural component, triggering a halt to the extension action. Once engaged and the grasping mechanism is securely coupled to the cargo container, the retraction process can be initiated.

Figure 9A:
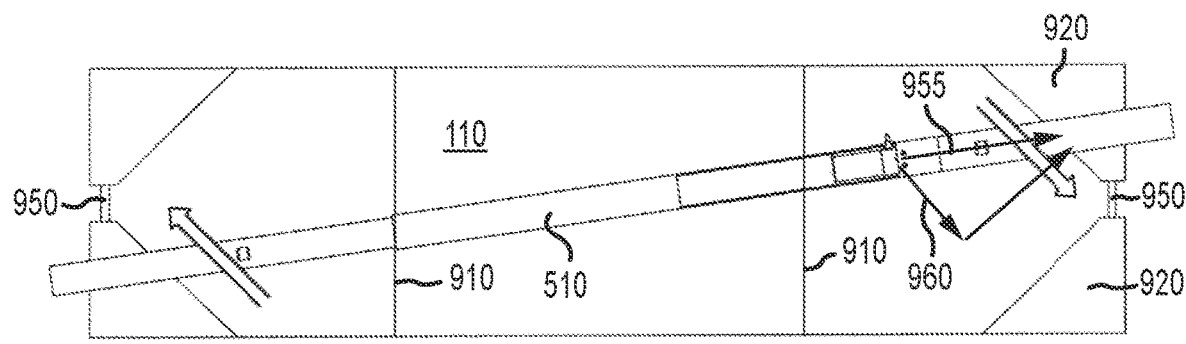
FIGS. 9A and 9B present a top view of the centering motion of the grasping mechanism, a centering guide and support structure of the cargo container, according to one embodiment of the present invention.

FIG. 9A presents a top view of a grasping mechanism 510 interacting with the cargo container 110 according to one embodiment of the present invention. The top view of the cargo container shown in FIG. 8 maintains two cross-bars 910 that span the width of the cargo container. As before the cross-bars 960 are located equidistant from the center of the container. Associated with each cross-bar are triangular guides 920 that rest within the corner of the cargo container positioned slightly above the top surface of the cross-bar. The triangular guides 920 rest on top of the structural cross-bar 950 and are of a thickness such that the elongated bill of the grasping mechanism can rest without interfering with the lower extension or cavity.

Figure 9B:
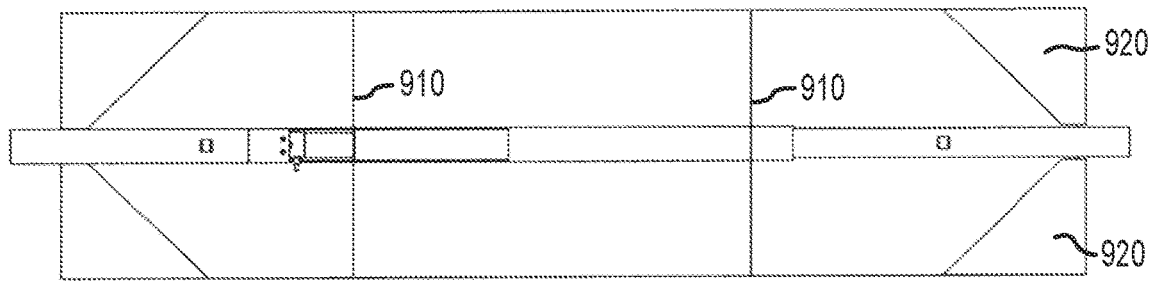

As the grasping mechanism lengthens, the force 955 exerted against the triangular guides 920 creates a centering component force 960. That centering force drives the grasping mechanism to a central location, as shown in FIG. 9B of the cross-bars at which point the grasping mechanism can engage and couple with the cargo container structural component 950.

Figure 10:
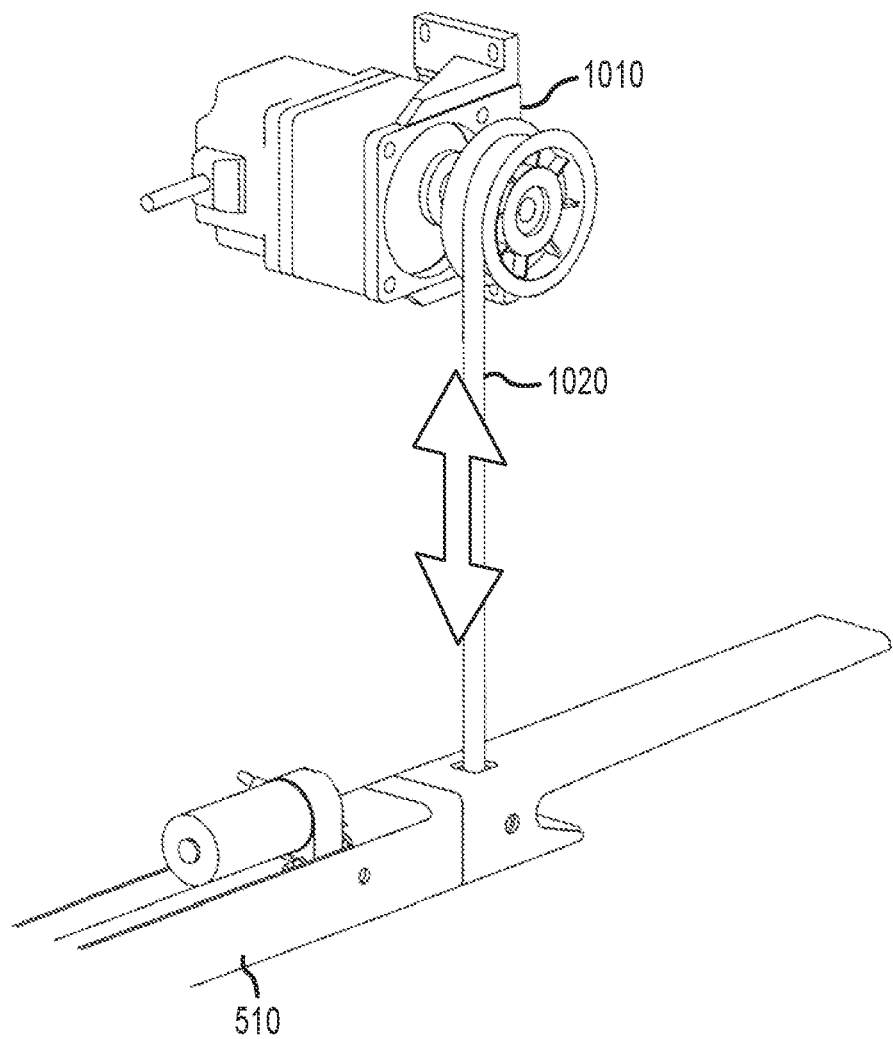
FIG. 10 is a perspective view of the grasping mechanism and the retraction mechanism, according to one embodiment of the present invention.

Responsive to the grasping mechanism 510 being fully engaged and coupled with the structural components of the cargo container, the retraction and extension mechanism can retrieve the cargo container toward the undercarriage of the UAV. FIG. 10 is a representation of a motor-driven retraction and extension mechanism 1010 according to one embodiment of the present invention. The retraction and extension mechanism employs cables, durable webbing, lines or similar flexible material 1020 from which to suspend the cargo container during the retraction/extension process.

Having a flexible retraction and extension mechanism enables the weight of the cargo container to be sensed at each attachment point and to utilize gravity to further refine the alignment of the cargo container to that of the UAV.

Figure 11A:
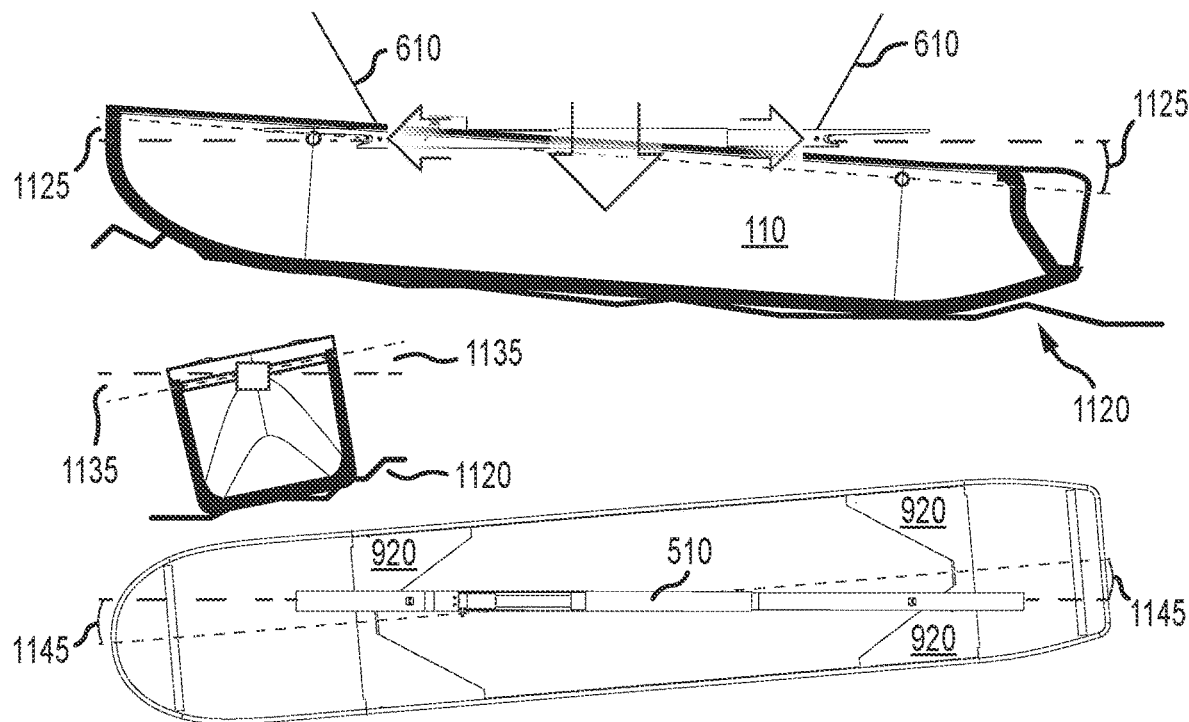
FIG. 11A and FIG. 11B each present side and top views of a cargo container subjected to an uneven environment and the grasping mechanism's engagement, according to one embodiment of the present invention.
Figure 11B:
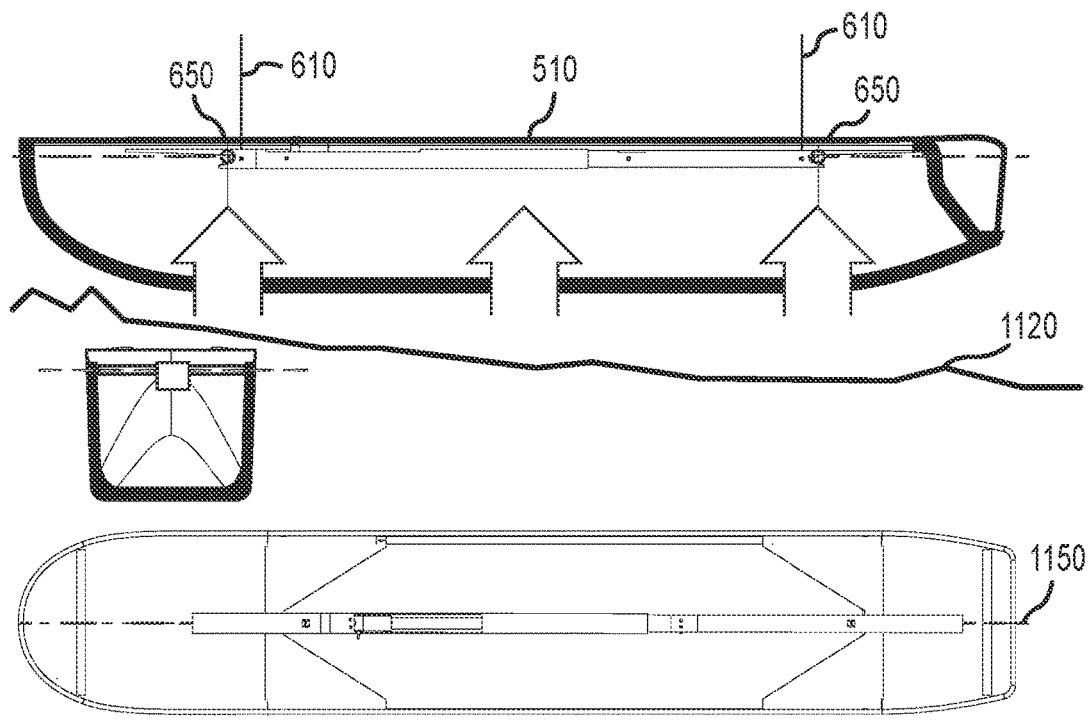

FIGS. 11A and 11B present a side, end and top view of a misaligned cargo container 110 as it interacts with the grasping, retraction and extension mechanism of the present invention. FIG. 11A shows a cargo container 110 that rests on an uneven surface 1120. The cargo container is elevated on one end 1125, leaning to one side 1135 and is canted longitudinally 1145. Indeed, the cargo container is misaligned with the UAV/grasping mechanism in all three axes. Referring to FIG. 11A, as the grasping mechanism 510 extends from the UAV the leftmost end of the elongated bill engages the triangular guides 920 located on that end of the cargo container 110. As the right end of the extension mechanism continues to extend, the right side of the grasping mechanism, the right portion of the grasping mechanism makes contact with a triangular guide located on the right side of the cargo container.

At this point, the grasping mechanism is in contact with the triangular guides 920 of the cargo container and different lengths of cable 610 have been extended from two independent retraction/extension mechanism. In addition, the grasping mechanism, while in contact with the triangular guides, is canted with respect to the lateral deviation 1135 of the cargo container.

As the grasping mechanism elongates, the triangular guides adjust the location of the grasping mechanism to be aligned with the centerline 1150 of the cargo container 110 and engaged with the structural component 650/(cross-bars) of the cargo container. Once engaged with the structural component 650, a locking cam 860 of the grasping mechanism 510 secures the grasping mechanism to the cargo container.

When the locking cam 860 indicates that the cargo container 110 is securely coupled to the grasping mechanism 510, the retraction and extension mechanism 1010 begin to retract the extended cable 610. Recognizing that the lengths of extended cable are not the same, the right retraction and extension mechanism 1010, in one embodiment, retracts first lifting the right portion of the cargo container off the ground. When the cable lengths become equal, both retraction and extension devices, retract their cables lifting the cargo container off the ground in its entirety.

Once the cargo container is no longer in contact with the ground, gravity will reposition the cargo container to be longitudinally and laterally aligned with the UAV. As the cargo container is retracted, sensors within each retraction and extension mechanism 1010 sense the total weight of the cargo container and the cargo container's weight distribution. Using this data, the vehicle control system, in conjunction with the flight control system, can determine if, and how, the added weight and weight distribution of the cargo container changes the UAV's center of gravity.

The retraction and extension mechanism retracts the cargo container until it mates with the UAV as depicted in FIG. 4D. The upper portion of the cargo container is formed to match the lower portion of the UAV to facilitate aerodynamic effects during flight. Once in position on the undercarriage of the UAV, a coupling mechanism 250 secures the cargo container 110 to the UAV 100. As one of reasonable skill in the relevant art will appreciate, flight loads can significantly modify structural requirements on aircraft. While a typical design load on ground-based equipment may be 1.5 of the expected maximum load, aircraft structures have to consider flight conditions that may place significantly larger loads on components due to acceleration forces. For manned aircraft, 6-9 times of normal gravitational loads must be considered and for drones 10 or more times of normal gravity is possible. Rather than require the design of the retraction and extension mechanism as well as the grasping mechanism to be robust enough to hand such dynamic loads, one embodiment of the present invention has a dedicated coupling mechanism 250 to couple the cargo container to the vehicle and the cargo container is aligned and properly positioned.

Upon mating the cargo container with the undercarriage of the UAV, a coupling mechanism 250 detachably affixes the cargo container to the vehicle. In one embodiment, a plurality of shear pins traverse a plurality of coupling joints to secure the cargo container to the UAV. The retraction and extension mechanism 1010 is then relaxed placing each of the shear pins in double shear. When the UAV arrives at its destination, the retraction and extension mechanism is again engaged to take the static load off the shear pins whereby they are retracted so as to enable extension and delivery of the cargo container.

Another feature of the present invention is the ability to manipulate the location of the cargo container along the longitudinal axis 310 of the UAV 110 to control the UAV's center of gravity. The center of gravity (CG) of an aircraft is the point over which the aircraft would balance if not in contact with the ground. The center of gravity affects the stability of the aircraft during flight. To ensure the aircraft is safe to fly and perform optimally, the center of gravity must fall within specified limits.

When the fore-aft center of gravity (CG) is out of range serious aircraft control problems occur. The fore-aft CG affects the longitudinal stability of the aircraft, with the stability increasing as the CG moves forward, and stability decreasing as the CG moves aft. With a forward CG position, although the stability of the aircraft increases, flight control authority is reduced. An aft CG position creates severe handling problems due to the reduced pitch stability and increased flight control sensitivity, with the potential loss of aircraft control.

The center of gravity is even more critical for rotor aircraft than it is for fixed-wing aircraft (weight issues remain the same). As with fixed-wing aircraft, a rotor aircraft may be properly loaded for takeoff, but near the end of a long flight when the fuel tanks are almost empty, the CG may have shifted enough for the rotor aircraft to be out of balance laterally or longitudinally. Improper balance of a rotor aircraft's load can result in serious control problems. In addition to making a rotor aircraft difficult to control, an out-of-balance loading condition also decreases maneuverability since differential lift control is less effective in the direction opposite to the CG location.

According to one embodiment of the present invention, a total weight of the cargo container is determined by the two or more retraction and extension mechanisms once the cargo container is suspended below the UAV. Additionally, each retraction and extension mechanism operates independently and independently determines its weight component to the cargo container's total weight. This information is communicated to the vehicle control system whereby the cargo container's total weight and weight distribution is determined. Knowing the prior UAV center of gravity as well as the predefined limits for the center of gravity under which UAV may safely operate, a new, modified, center of gravity can be determined. This modified, center of gravity reflects the UAV center of gravity when the cargo container is retracted toward and coupled to the UAV.

In another embodiment of the present invention, the longitudinal placement of the cargo container on the exterior of the UAV can be modified. In one version the entirety of the grasping mechanism and two or more retraction and extension mechanisms (the lifting system) exists on a movable carriage or track. Once the cargo container is in close proximity with the UAV, but prior to coupling the cargo container to the UAV, the lifting system moves forward or aft along a track to modify the location on the UAV at which the additional weight of the cargo container is coupled. Multiple attachment points can exist along the track by which the shear pins can affix the cargo container to the UAV.

Figure 12A:
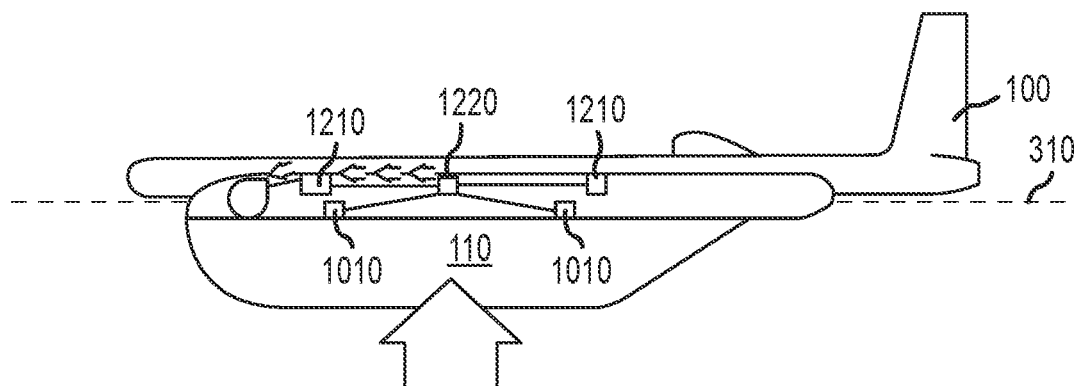
FIG. 12A and FIG. 12B are side views of a cargo container center of gravity repositioning system, according to one embodiment of the present invention.

Considering the example shown in FIG. 12, whereby the two or more retraction and extension mechanisms are coupled to central support structures 1210. As the cargo container 110 mates with the UAV 100, the vehicle control system senses the weight of the container and the weight distribution. Using this information the vehicle control system determines if the UAV's center of gravity, with the cargo container in its current position, remains within the acceptable flight limits. The vehicle control system also determines the optimal position of the UAV for flight operations. For example, movement of the cargo container fore or aft may enable more optimal cruise conditions to maximize fuel endurance or maneuverability during takeoff and landing operations.

Figure 12B:
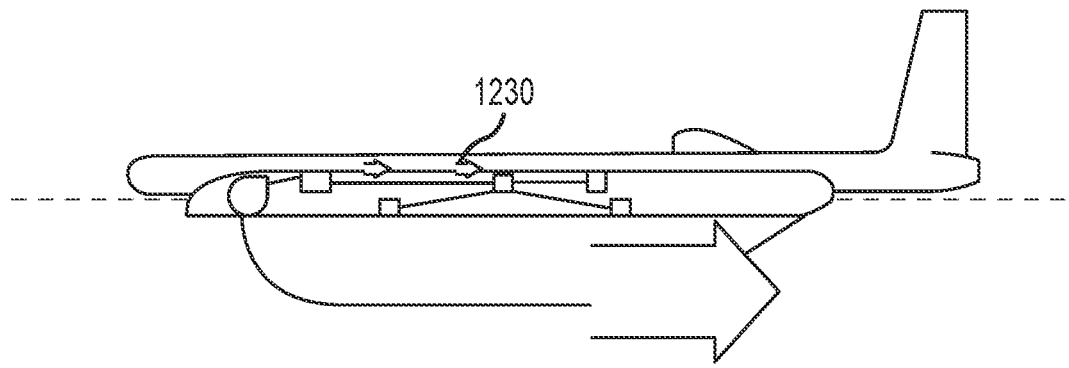

In this example, the vehicle control system determines that UAV performance can be optimized by placing the cargo container's weight further aft along the centerline of the fuselage. The central support is shifted aft 1230 as shown in FIG. 12B moving the cargo container aft along with UAV's longitudinal axis. Once the cargo container reaches its desired location, the coupling mechanism 250 affixes the cargo container 110 to the vehicle 100 for flight operations. One of reasonable skill in the relevant art will appreciate that numerous means exist by which to reposition the cargo container along the longitudinal exist of the vehicle. While the two options presented here are viable options, others are contemplated and remain with the scope of the present invention.

Figure 13A:
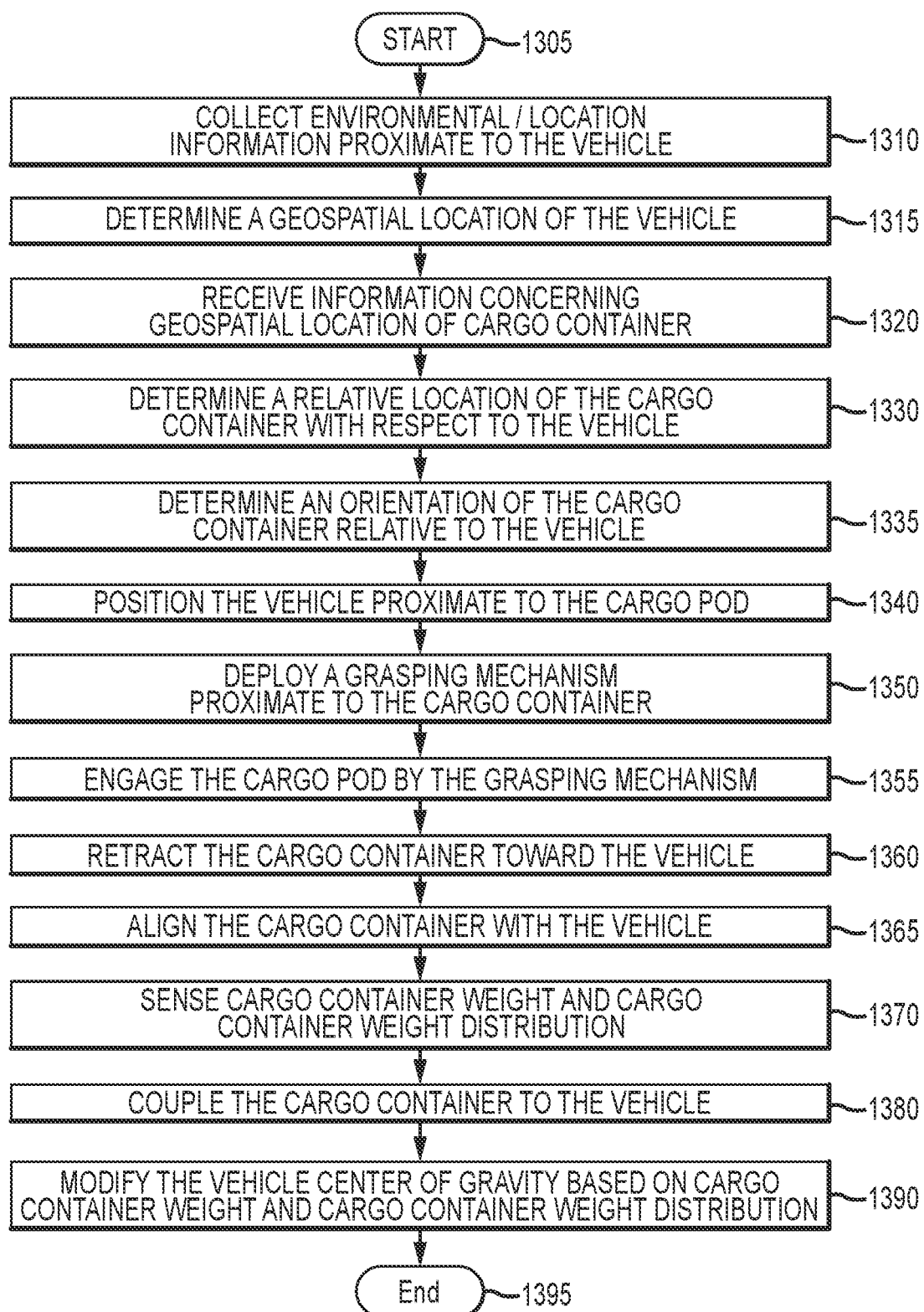
FIG. 13A is a flowchart of one methodology, according to the present invention, for autonomously retrieving a cargo container with FIG. 13B providing a visual depiction of same.
Figure 13B:
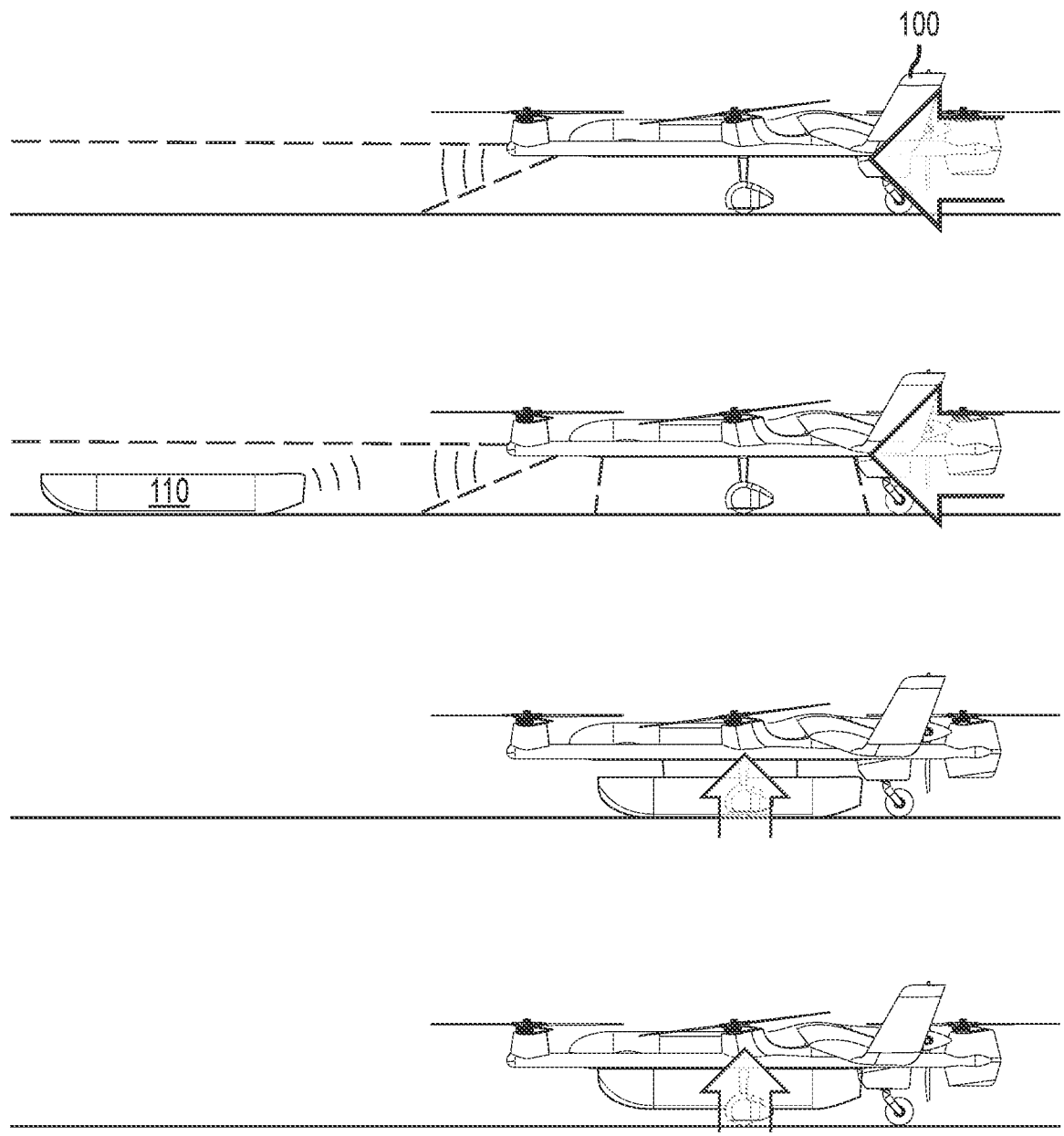
Figure 14:
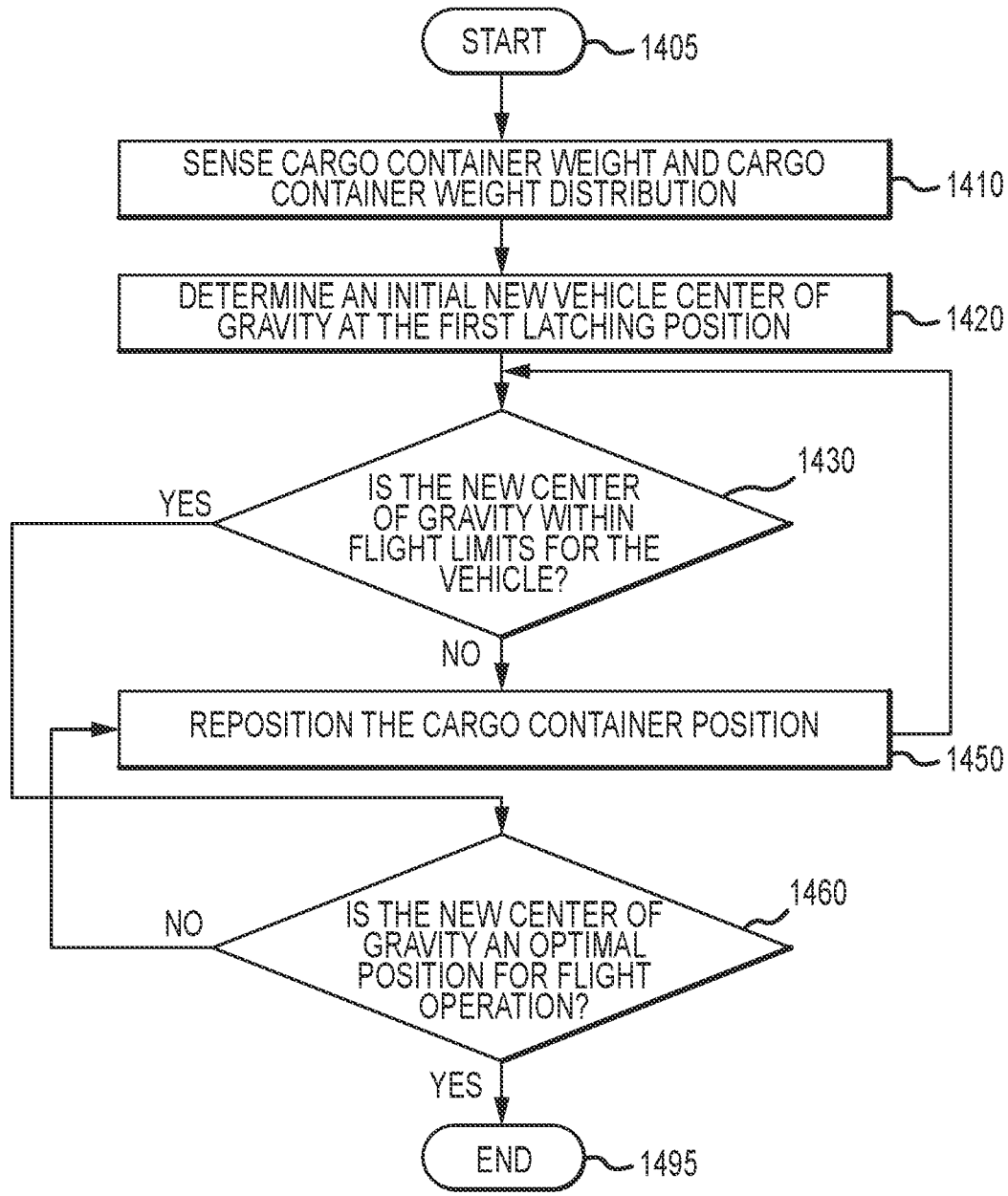
FIG. 14 is a flowchart of one methodology, according to the present invention, for repositioning a cargo container's center of gravity.

FIGS. 13 and 14 are flowcharts depicting examples of the methodology which may be used to autonomously retrieve and deliver a cargo container as well as reposition the cargo container relative to the vehicle to manipulate the vehicle's center of gravity. The steps described herein are accomplished via a combination software, firmware and hardware positioned on the vehicle and the cargo container. Certainly, other components many interact with both the vehicle and the cargo container to enable the autonomous retrieval and delivery of a cargo container, however, the steps and processes described herein fundamentally relate to the vehicle and container.

The process by which a cargo container is autonomously retrieved for delivery by a vehicle begins 1305 with collecting 1310 environmental/locational information proximate to the vehicle. Such information is acquired via on-board devices or is communicated to the vehicle from other data sources. For example, the vehicle may be able to sense certain aspects of its surrounding environment using on-board sensors while at the same time general geographic information or information as to local operations can be transmitted or transferred to the vehicle.

In one embodiment of the present invention, on-board sensors determine 1315 the geospatial location of the vehicle. For purposes of the present invention a geospatial location is the location of the vehicle using a global or standardized coordinate system. For example, the vehicle, in one embodiment, may include one or more GPS receivers to provide the vehicle with its geospatial location at a terminal or cargo facility. Knowing the vehicle's position, the process continues by receiving 1320 information concerning the geospatial location of a cargo container.

The geospatial location of the cargo container can be used to determine 1338 its location relative to the vehicle. With such information and additional data regarding the local environment, such as air terminal or cargo terminal layout, the vehicle control system can plan a path by which the vehicle can navigate from its current location to the proximity of the cargo container.

Referring in addition to FIG. 13B, the process to autonomously retrieve a cargo container 110 continues by gaining additional data with respect to immediate vicinity surrounding the cargo container. Recall that the vehicle has navigated from its initial location to the proximity of the cargo container using on-board mapping, dead reckoning, known pathways, GPS data and the like. Having arrived near the cargo container the vehicle, in one embodiment, determines the orientation 1335 of the cargo container relative to that of the vehicle. Using optical systems, fiducial markers, two-way time-of-flight calculations, LIDAR, RADAR and other systems, the vehicle determines the position and orientation of the cargo container. In another embodiment, the vehicle relies on prior predetermined information of the exact location and orientation of the cargo container in lieu of real-time sensor measurement. In this embodiment, the cargo container is prepositioned with sufficient accuracy that on-board vehicle sensors are not required to place the vehicle in position for recovery of the container. With such information, the vehicle control system positions 1340 the vehicle proximate (astride) the cargo container and in position to lower the grasping mechanism.

Astride the cargo container, the vehicle deploys 1350 the grasping mechanism proximate to the cargo container. As the grasping mechanism descends from the undercarriage of the vehicle a portion of the grasping mechanism makes contact with the upper portion or an upper structural component of the cargo container. In one embodiment a central portion of the grasping mechanism rests on two cross-bars that span the cargo container and in other embodiments an elongated bill associated with the grasping mechanism rests on either a triangular guide or a cross-bar.

Once in contact with the cargo container the grasping mechanism extends lengthwise until each end of the grasping mechanism engages and couples to a structural component of the cargo container. In other embodiments the grasping mechanism engages a triangular guide which channels the grasping mechanism to the support cross-bar structural component.

Responsive to the grasping mechanism having engaged/coupled with the cargo container, the retraction and extension mechanism begins retracting 1360 the cargo container toward the vehicle. As the cargo container is suspended below the vehicle, the cargo container aligns 1365 with the vehicle. For example, if the cargo container is in the proximity and within a predefined degree of alignment but nonetheless, misaligned or miss-positioned, gravity will reposition and realign the cargo container to the vehicle.

As the cargo container is retracted toward the vehicle, the cargo container's weight and the cargo container's weight distribution is sensed 1370 and reported to the vehicle control system. Upon making contact with the vehicle the cargo container is affixed 1380 to the vehicle by the coupling mechanism to enable the cargo container to remain securely attached to the vehicle during flight operations. Once the cargo container is security affixed to the vehicle, the retraction and extension mechanism is relaxed slightly to extend the mechanism's lifespan.

Data collected with respect to the cargo container's weight and weight distribution is used to modify 1390 the system's understanding of the vehicle's center of gravity. The new total weight of the vehicle and the newly determined center of gravity are then verified as being within an acceptable range before signaling to the vehicle that it can relocate and initiate delivery operations, ending 1395 the retrieval process.

One of reasonable skill in the relevant art will recognize that the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Recall, the disclosure of the present invention is intended to be illustrative, and not limiting, of the scope of the invention.

Portions of the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, flash, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

In other embodiments of the present invention the vehicle can retrieve or deliver a cargo container in a semi-autonomous mode of operations. In this version of the invention, the vehicle can receive information with respect to the location of a cargo contain positioned for retrieval. The vehicle can self-navigate to the location without necessarily using on-board sensors to identify the container or its position with respect to the vehicle. The cargo container is positioned precisely and its location and orientation are communicated to the vehicle. For example a cargo container is placed in a loading area and its exact location (GPS) and its orientation are measured and verified by an operator. The operator may use a GPS receiver to record the exact location of the container or even certain portions of the container, or, alternatively, a picture can be taken of the container in its location such that fiducial markers on the ground and container can be seen and analyzed. Knowing the exact location of the markers on the ground, and the relation of the container to those markers, the location and orientation of the container can be communicated to the vehicle. Once astride the container, the vehicle can then use on-board systems to verify the exact location of the container to initiate the grasping process.

Turning attention to FIG. 14, a process for modifying and/or optimizing a vehicle's center of gravity begins 1405 with sensing 1410 the cargo container's weight and the cargo container's weight distribution. As shown before in FIG. 13, a new or modified vehicle center of gravity is determined 1420 based on the weight distribution of the cargo container and an inquiry is thereafter made as to whether 1430 the new center of gravity falls within acceptable flight limits. If the answer is no, the cargo container is repositioned 1450 fore or aft until the modified center of gravity falls within acceptable flight limits. Note that if the total weight of the aircraft is beyond acceptable flight limits, the vehicle control system, in one embodiment of the present invention, rejects the cargo container, resulting in the retraction and extension mechanism to place the cargo container back on the ground and detach the grasping mechanism.

Responsive to the vehicle control system confirming that the center of gravity of the vehicle, with newly added cargo container attached, is within acceptable operating limits, the mission profile is considered 1460. Knowing the mission profile for delivery of the cargo container, an inquiry is made whether the center of gravity of the vehicle is optimized for flight operations. If the response to the inquiry is no, the vehicle control system again repositions the cargo container for or aft to optimize the performance of the vehicle, all the while retaining the center of gravity within acceptable flight limits. With the cargo container attached and the newly computed center of gravity both within acceptable flight lights and optimized for flight operations, the process terminates 1495.

Recall that portions of the invention may be implemented via software executed on a machine such as a general purpose computing device. Such a device may take the form of a conventional personal computer, a personal communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment. Embodiments of the present invention as having been herein described may be implemented with reference to various wireless networks and their associated communication devices.

While there have been described above the principles of the present invention in conjunction with a system for autonomous retrieval and delivery of a cargo container, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A method for autonomous retrieval and delivery of cargo, the method comprising:
    collecting information regarding an environment proximate to a vehicle wherein the environment includes a cargo container distinct from the vehicle and wherein the cargo container has a width and a length and includes a first cross bar and a second cross bar, each cross bar spanning the width of the cargo container and wherein each cross bar is associated with a guide;
    determining a position and an orientation of the cargo container relative to the vehicle;
    positioning the vehicle above and in proximity to the cargo container;
    extending from the vehicle, a grasping mechanism thereby contacting the cargo container, wherein the grasping mechanism includes a longitudinal member having a profile length, a first end, a second end, and a profile width, and wherein responsive to the grasping mechanism contacting the cargo container, increasing the profile length of the grasping mechanism;
    grasping the cargo container wherein, responsive to increasing the profile length of the grasping mechanism, grasping includes engaging by the first end of the grasping mechanism the first cross bar and engaging by the second end of the grasping mechanism the second cross bar;
    raising the grasping mechanism, thereby raising the cargo container and substantially aligning the grasping mechanism and the cargo container with a centerline of the vehicle, to mate with an exterior surface of the vehicle; and
    coupling the cargo container to the vehicle.

2. The method for autonomous retrieval and delivery of cargo according to claim 1, wherein collecting includes determining a geospatial location of the vehicle and the cargo container using a GPS system.

3. The method for autonomous retrieval and delivery of cargo according to claim 1, wherein collecting includes determining a geospatial location of the vehicle and the cargo container using a radio frequency positioning system.

4. The method for autonomous retrieval and delivery of cargo according to claim 1, wherein collecting includes determining geospatial location of the vehicle and the cargo container using optical sensors.

5. The method for autonomous retrieval and delivery of cargo according to claim 1, wherein determining includes identifying the orientation of the cargo container with respect to the vehicle.

6. The method for autonomous retrieval and delivery of cargo according to claim 1, wherein positioning includes locating the grasping mechanism within a predetermined distance and orientation of the cargo container.

7. The method for autonomous retrieval and delivery of cargo according to claim 1, wherein positioning includes placing the grasping mechanism within a predetermined degree of alignment of the cargo container.

8. The method for autonomous retrieval and delivery of cargo according to claim 1, wherein coupling includes mounting the cargo container to an exterior surface of the vehicle.

9. The method for autonomous retrieval and delivery of cargo according to claim 1, wherein raising includes sensing a cargo container weight and sensing a cargo container weight distribution of the cargo container.

10. A method for autonomous retrieval and delivery of cargo, the method comprising: retrieving environmental information proximate to a vehicle including information regarding a cargo container distinct from the vehicle, a position of the cargo container relative to the vehicle and an orientation of the cargo container relative to the vehicle and wherein the cargo container includes a first structural component and a second structural component, each structural component being associated with a guide;
    positioning the vehicle above the cargo container and within a predetermined degree of alignment of the cargo container;
    extending from the vehicle, a grasping mechanism thereby contacting the cargo container, wherein the grasping mechanism includes a longitudinal member having a length, a first end, and a second end, and wherein responsive to the grasping mechanism contacting the cargo container, increasing the length of the grasping mechanism;
    grasping the cargo container wherein, responsive to increasing the length of the grasping mechanism, grasping includes engaging by the first end of the grasping mechanism the first structural component and engaging by the second end of the grasping mechanism the second structural component;
    raising the grasping mechanism, whereby raising the grasping mechanism substantially aligns the grasping mechanism and the cargo container parallel or coincident with a longitudinal axis of the vehicle, to mate the cargo container with an exterior surface of the vehicle; and
    mounting the cargo container to the exterior surface of the vehicle at one or more of a plurality of mounting points.

11. The method for autonomous retrieval and delivery of cargo of claim 10, further comprising, responsive to raising the grasping mechanism moving the grasping mechanism and, thereby the cargo container, fore or aft along the centerline based on a weight of the cargo container and center of gravity limitations of the vehicle.

12. The method for autonomous retrieval and delivery of cargo of claim 11, further comprising optimizing a mounting location of the cargo container on the vehicle based on current flight operations.

13. The method for autonomous retrieval and delivery of cargo according to claim 10, wherein retrieving includes accessing a geospatial location of the vehicle and the cargo container from a GPS system.

14. The method for autonomous retrieval and delivery of cargo according to claim 10, wherein retrieving includes receiving data identifying a geospatial location of the cargo container.

15. The method for autonomous retrieval and delivery of cargo according to claim 10, wherein retrieving data from optical sensors sufficient to identify a location of the cargo container relative to the vehicle.

16. The method for autonomous retrieval and delivery of cargo according to claim 10, wherein determining includes identifying the orientation of the cargo container with respect to the vehicle.

17. The method for autonomous retrieval and delivery of cargo according to claim 10, wherein positioning includes locating the grasping mechanism within a predetermined distance and orientation of the cargo container.

\* \* \* \* \*